(12) United States Patent
Maresh et al.

(10) Patent No.: US 10,086,934 B2
(45) Date of Patent: Oct. 2, 2018

(54) COMPOSITE ROTOR SYSTEM USING TWO RACE TRACK STYLE CANTILEVERED YOKES

(71) Applicant: Bell Helicopter Textron Inc., Fort Worth, TX (US)

(72) Inventors: Andrew Maresh, Lewisville, TX (US); Frank Bradley Stamps, Colleyville, TX (US); Patrick Ryan Tisdale, Keller, TX (US); Robert Patrick Wardlaw, Keller, TX (US); Andrew Haldeman, Fort Worth, TX (US); Drew Alan Sutton, Hurst, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 143 days.

(21) Appl. No.: 15/362,424

(22) Filed: Nov. 28, 2016

(65) Prior Publication Data
US 2017/0073067 A1 Mar. 16, 2017

Related U.S. Application Data

(62) Division of application No. 13/801,733, filed on Mar. 13, 2013, now Pat. No. 9,505,490.

(51) Int. Cl.
B64C 27/33 (2006.01)
B64C 27/48 (2006.01)
(Continued)

(52) U.S. Cl.
CPC ............. B64C 27/33 (2013.01); B64C 11/02 (2013.01); B64C 11/12 (2013.01); B64C 27/35 (2013.01); B64C 27/48 (2013.01)

(58) Field of Classification Search
CPC ......... B64C 27/48; B64C 27/33; B64C 27/32; B64C 27/35; B64C 11/02; B64C 11/12
See application file for complete search history.

(56) References Cited

U.S. PATENT DOCUMENTS 3,874,815 A * 4/1975 Baskin .................... B64C 27/33
244/17.25
4,008,980 A * 2/1977 Noehren ................. B64C 27/33
416/134 A
(Continued)

FOREIGN PATENT DOCUMENTS

EP 22918 B1 2/1984
EP 97885 B1 9/1987
(Continued)

OTHER PUBLICATIONS

European Patent Office, Communication pursuant to Article 94(3) EPC for European Appl. No. 13180136.7 dated May 23, 2014, 6 pp.
(Continued)

Primary Examiner — Mark Laurenzi
Assistant Examiner — Xiaoting Hu
(74) Attorney, Agent, or Firm — Daniel J. Chalker; Edwin S. Flores; Chalker Flores, LLP

(57) ABSTRACT

A hub system comprises at least one yoke, at least one shear bearing, and at least one mast adapter. The at least one mast adapter is configured to support the at least one yoke and the at least one shear bearing, and the at least one yoke has a flapping hinge that is non-coincident with a flapping hinge of the at least one shear bearing. Another hub system comprises a stacked yoke and a mast adapter. The mast adapter is configured to transfer rotation from a rotor mast to the hub system to rotate the hub system about a central axis of rotation. The mast adapter is further configured to support the stacked yoke such that each yoke in the stacked yoke is configured to accommodate at least some amount of
(Continued)

rotation about an axis that is perpendicular to or about perpendicular to the central axis of rotation.

9 Claims, 18 Drawing Sheets

(51) Int. Cl.
*B64C 11/02* (2006.01)
*B64C 11/12* (2006.01)
*B64C 27/35* (2006.01)

(56) References Cited

U.S. PATENT DOCUMENTS

| | | | |
|---|---|---|---|
| 4,047,839 A | 9/1977 | Ferris et al. | |
| 4,227,857 A | 10/1980 | Reyes | |
| 4,293,276 A * | 10/1981 | Brogdon | B64C 27/33 416/134 A |
| 4,349,316 A | 9/1982 | Hughes et al. | |
| 4,349,317 A | 9/1982 | Desjardins | |
| 4,369,018 A * | 1/1983 | Brunsch | B64C 27/33 416/134 A |
| 4,381,902 A * | 5/1983 | Head | B64C 27/33 416/134 A |
| 4,427,340 A | 1/1984 | Metzger et al. | |
| 4,430,045 A * | 2/1984 | Cresap | B64C 27/001 244/17.27 |
| 4,626,172 A | 12/1986 | Mouille et al. | |
| 4,650,401 A | 3/1987 | Yao et al. | |
| 4,676,720 A | 6/1987 | Niwa et al. | |
| 4,746,272 A * | 5/1988 | Noehren | B64C 27/33 416/134 A |
| 4,898,515 A | 2/1990 | Beno et al. | |
| 5,286,167 A | 2/1994 | Byrnes et al. | |
| 5,690,474 A | 11/1997 | Byrnes et al. | |
| 6,196,800 B1 | 3/2001 | Bauer et al. | |
| 7,153,094 B2 * | 12/2006 | Sehgal | B64C 27/001 415/119 |
| 7,665,969 B2 | 2/2010 | Stamps et al. | |
| 8,444,382 B2 | 5/2013 | Stamps et al. | |
| 8,764,396 B2 | 7/2014 | Stamps et al. | |
| 8,926,281 B2 | 1/2015 | Stamps et al. | |
| 8,956,117 B2 | 2/2015 | Stamps et al. | |
| 9,073,625 B1 | 7/2015 | Ingram, III et al. | |
| 9,505,489 B2 | 11/2016 | Sutton et al. | |
| 9,505,490 B2 | 11/2016 | Maresh et al. | |
| 2006/0165527 A1 * | 7/2006 | Stamps | B64C 27/33 416/134 A |
| 2014/0271199 A1 | 9/2014 | Maresh et al. | |
| 2016/0280367 A1 | 9/2016 | Haldeman et al. | |

FOREIGN PATENT DOCUMENTS

| | | |
|---|---|---|
| EP | 323857 B1 | 5/1993 |
| EP | 2778052 A1 | 9/2014 |
| EP | 2778054 A1 | 9/2014 |
| EP | 2778055 A2 | 9/2014 |
| EP | 3072814 A1 | 9/2016 |
| GB | 2001025 A | 1/1979 |
| GB | 2033861 A | 5/1980 |
| WO | 2007106064 A2 | 9/2007 |

OTHER PUBLICATIONS

European Patent Office, Communication pursuant to Article 94(3) for European Appl. No. 13180136.7 dated Feb. 12, 2015, 4 pp.
European Patent Office, Communication pursuant to Article 94(3) for European Appl. No. 13180136.7 dated Sep. 2, 2015, 4 pp.
European Patent Office, Communication pursuant to Article 94(3) for European Appl. No. 14152690.5 dated Mar. 5, 2015, 6 pp.
European Patent Office, Communication pursuant to Article 94(3) for European Appl. No. 15188195.0 dated May 4, 2016, 5 pp.
European Patent Office, Communication under Rule 71(3) EPC for European Appl. No. 13168626.3 dated Sep. 15, 2014, 35 pp.
European Patent Office, Communication under Rule 71(3) EPC for European Appl. No. 13180136.7 dated Mar. 11, 2016, 48 pp.
European Patent Office, Communication under Rule 71(3) EPC for European Appl. No. 14152690.5 dated Nov. 17, 2015, 23 pp.
European Patent Office, European Search Report for European Appl. No. 13168626.3 dated Nov. 11, 2013, 9 pp.
European Patent Office, European Search Report for European Appl. No. 13180136.7 dated May 13, 2014, 5 pp.
European Patent Office, European Search Report for European Appl. No. 15188195.0 dated Apr. 22, 2016, 4 pp.
European Patent Office, Invitation pursuant to Rule 62a(1) EPC for European Appl. No. 14152690.5 dated Jun. 11, 2014, 4 pp.
European Patent Office, Partial European Search Report for European Appl. No. 14152690.5 dated Oct. 9, 2014, 7 pp.
European Patent Office, Communication pursuant to Rule 94(3) EPC for European Appl. No. 13168626.3 dated Mar. 18, 2014, 4 pp.
European Patent Office, Communication pursuant to Rule 94(3) EPC for European Appl. No. 14152690.5 dated Mar. 18, 2015, 4 pp.
United Stated Patent & Trademark Office, Office Action dated Nov. 5, 2015 for U.S. Appl. No. 13/797,334, 12 pp.

* cited by examiner

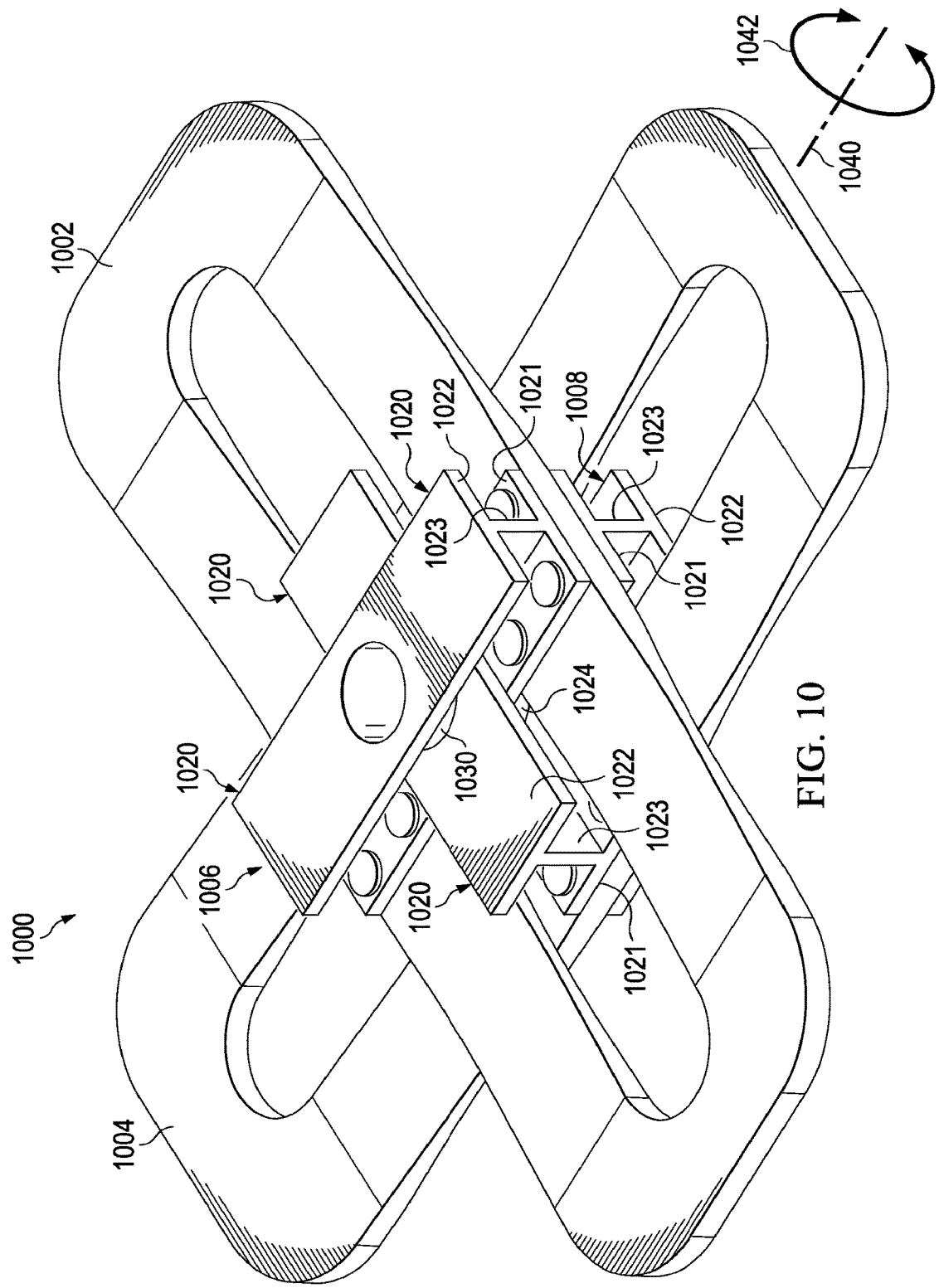

COMPOSITE ROTOR SYSTEM USING TWO RACE TRACK STYLE CANTILEVERED YOKES

CROSS-REFERENCE TO RELATED APPLICATIONS

This application claims priority to and is a divisional patent application of U.S. patent application Ser. No. 13/801,733 filed on Mar. 13, 2013, now U.S. Pat. No. 9,505,490, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When a helicopter hovers, each of the blades is moving at the same speed relative to the air (i.e., each blade has the same air speed). Thus, each blade generates the same amount of lift. However, as a helicopter moves, the helicopter blade or blades that are moving in the same direction as the helicopter movement (i.e., the advancing blades) experience a greater air speed, and the helicopter blade or blades that are moving in the opposite direction as the helicopter movement (i.e., the retreating blades) experience a lower air speed. In such a case, the advancing blades generate more lift and flap up relative to their hover positions, and the retreating blades generate less lift and flap down relative to their hover positions. This results in a phenomenon known as dissymmetry of lift where the advancing blades generate more lift than the retreating blades.

To compensate for dissymmetry of lift and provide a stable helicopter, helicopter rotors are commonly designed to accommodate at least some amount of up and down flapping motion while changing the angle of attack for each of the blades. For instance, a helicopter rotor can be designed to decrease the angle of attack of an advancing blade as it flaps up relative to its hover position, thereby decreasing the amount of lift that is generated. Similarly, the helicopter rotor can be designed to increase the angle of attack of a retreating blade as it flaps down relative to its hover position, thereby increasing the amount of lift that is generated. Accordingly, the combination of flapping and changing the angles of attack of the blades can be used to balance the lift generated by each of the blades.

SUMMARY

In some embodiments of the disclosure, a hub system is provided that comprises at least one yoke, at least one shear bearing, and at least one mast adapter. The at least one mast adapter is configured to support the at least one yoke and the at least one shear bearing, and the at least one yoke has a flapping hinge that is non-coincident with a flapping hinge of the at least one shear bearing.

In other embodiments of the disclosure, a hub system is provided that comprises a stacked yoke and a mast adapter. The mast adapter is configured to transfer rotation from a rotor mast to the hub system to rotate the hub system about a central axis of rotation. The mast adapter is further configured to attach to and support the stacked yoke such that each yoke in the stacked yoke is configured to accommodate at least some amount of rotation about an axis that is perpendicular to or about perpendicular to the central axis of rotation.

In yet other embodiments of the disclosure, a hub system is provided that comprises a mast adapter, a stacked yoke, and a spring mechanism. The mast adapter is configured to support the stacked yoke and the spring mechanism. The mast adapter is further configured to restrain the stacked yoke in in-plane and out-of-plane directions, and the spring mechanism is configured to control a bent shape of yokes in the stacked yoke.

BRIEF DESCRIPTION OF THE DRAWINGS

For a more complete understanding of the disclosure and the advantages thereof, reference is now made to the following brief description, taken in connection with the accompanying drawings and detailed description:

FIG. 10 is a perspective view of a composite rotor system having I-shaped arms according to an embodiment of the disclosure;

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the implementations, drawings, and techniques illustrated below, including the exemplary designs and implementations illustrated and described herein, but may be modified within the scope of the appended claims along with their full scope of equivalents.

Certain embodiments of the disclosure include a composite rotor system that uses two race track style cantilevered yokes. In at least some circumstances, the composite rotor system may increase the flapping angles of a rotor blade. For instance, in one particular embodiment, for illustration purposes only and not by limitation, a composite rotor system includes two race track style cantilevered yokes that are disposed between and supported by two cruciform mast adapters. The two cruciform mast adapters only have a limited amount of contact or no contact with the yoke flexure sections, which results in the yoke flexure sections being able to accommodate a greater amount of flapping. The increased flapping ability can be advantageous in that it allows for an extension of the flight envelope. For example, the increased flapping ability may be able to accommodate a greater range of gross weights, center of gravity locations, maneuverability, top speeds, etc. Additionally, at least certain embodiments of the disclosure may also be advantageous in that they have lower weights and require fewer components than other rotor systems. These and other features and advantages of embodiments are described in greater detail below and shown in the accompanying figures.

Figure 1:
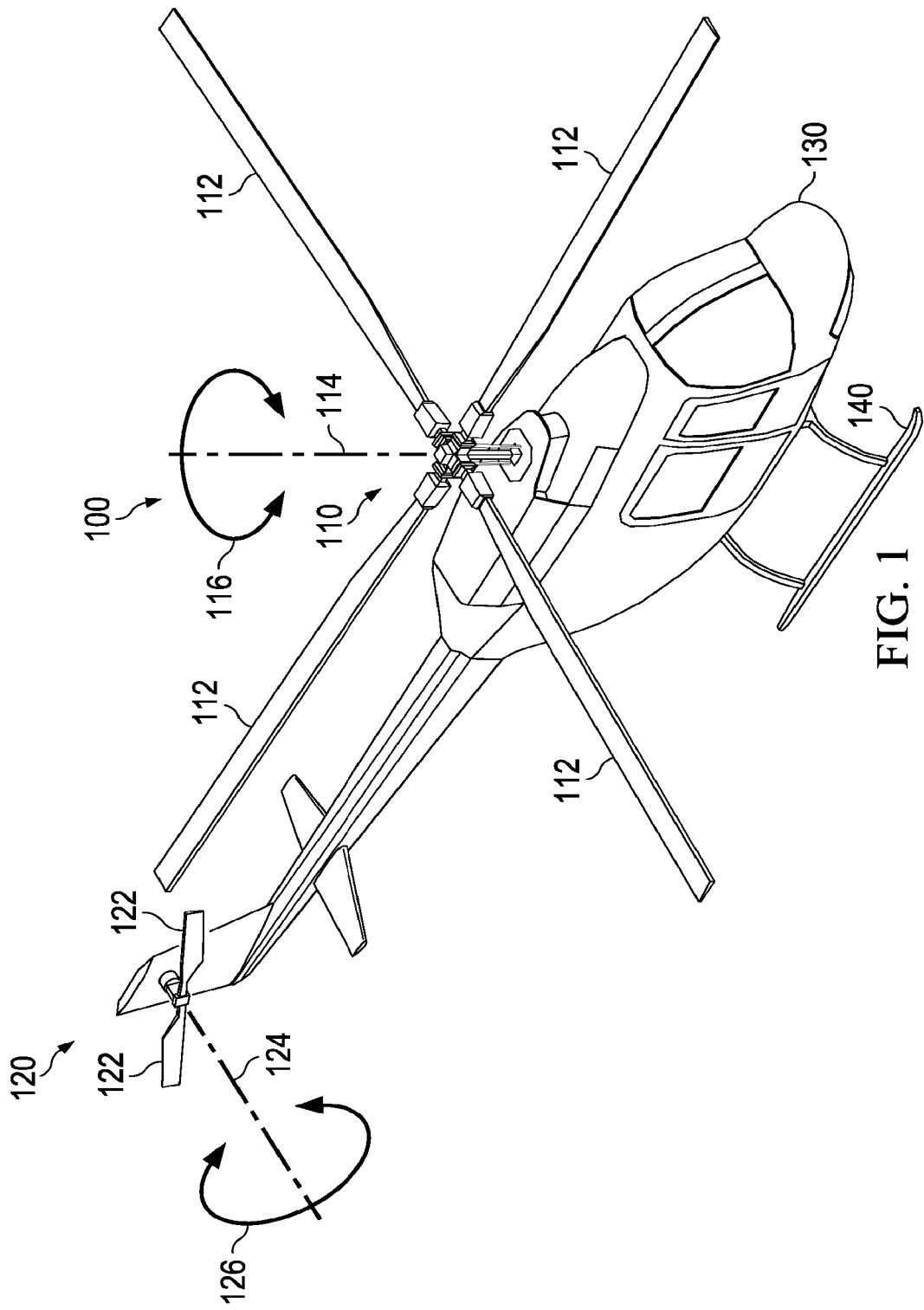
FIG. 1 is a perspective view of a helicopter according to an embodiment of the disclosure.

FIG. 1 is a perspective view of a helicopter 100. Certain embodiments of the disclosure may be used with a helicopter such as helicopter 100. However, it should be understood that the helicopter example is given merely for illustration purposes only. Embodiments of the present disclosure are not limited to any particular setting or application, and embodiments can be used with a rotor system in any setting or application such as with other aircraft, vehicles, or equipment.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag. Main rotor assembly 110 can also be used to induce pitch and roll of helicopter 100.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the yaw of helicopter 100.

Fuselage 130 is the main body section of helicopter 100. Fuselage 130 optionally holds the crew, passengers, and/or cargo and houses the engine, transmission, gear boxes, drive shafts, control systems, etc. that are needed to establish an operable helicopter. Landing gear 140 is attached to fuselage 130 and supports helicopter 100 on the ground and allows it to take off and land.

Figure 2:
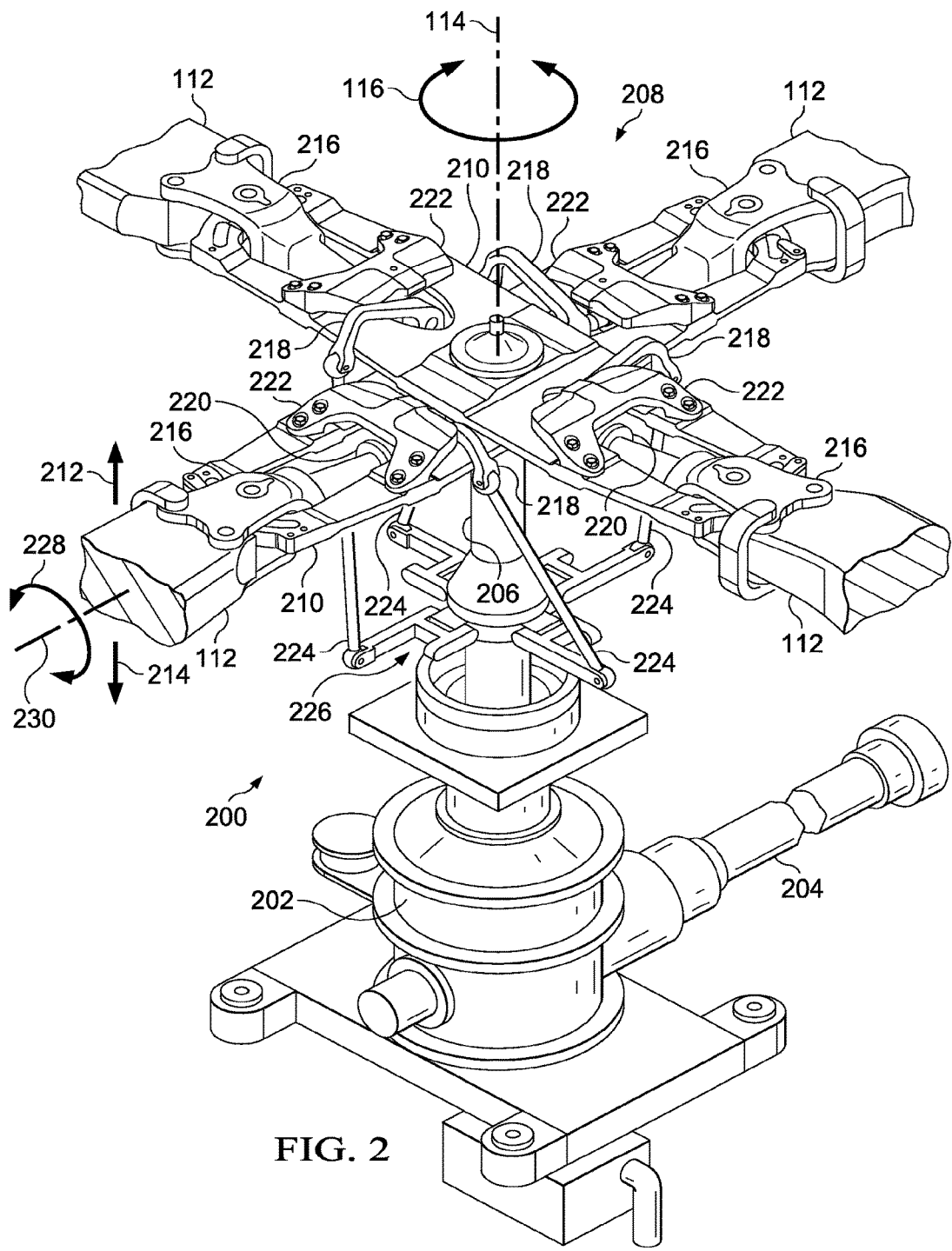
FIG. 2 is a perspective view of a power train according to an embodiment of the disclosure.

FIG. 2 is a perspective view of a power train 200. Power train 200 can be used in a helicopter such as helicopter 100 shown in FIG. 1. However, power train 200 is not limited to any particular setting. Additionally, it should be noted that the particular example shown in FIG. 2 shows a soft-in plane rotor system having four blades 112. Embodiments of the disclosure are not limited to any particular configuration of rotor system and blades, and embodiments may include any type of rotor system (e.g., fully articulated, rigid, semirigid, etc.) and may include any number of blades (e.g., 2, 3, 4, 5, 6, etc.).

Power train 200 includes a transmission 202 that receives power from an engine (not shown) through a driveshaft 204. Transmission 202 drives accessories and controls the rotation as indicated by arrow 116 of mast 206 about an axis of rotation 114. Mast 206 transfers its rotational movement to blades 112 through a hub 208 that connects mast 206 to blades 112

Hub 208 optionally includes one or more flexible yokes 210 that enable blades 112 to flap up in the direction indicated by arrow 212 and flap down in the direction indicated by arrow 214. Hub 208 may also include a main rotor grip 216 for each blade 112 that is attached to hub 208. Main rotor grip 216 includes an outboard end that attaches to a blade 112, an inboard end that attaches to a pitch horn 218, and a spindle between the outboard end and the inboard end. The spindle is supported by a shear bearing 220 that holds the spindle in place and allows it to rotate. Shear bearing 220 is in turn held in place by a bridge plate 222 that attaches shear bearing 220 to yoke 210.

Each pitch horn 218 is connected to a pitch linkage 224. Each pitch linkage 224 is driven up and down (e.g., in the directions shown by arrows 212 and 214) by a swashplate assembly 226. Accordingly, as swashplate assembly 226 moves, it drives pitch linkage 224, which drives pitch horn 218 which rotates main rotor grip 216 about shear bearing 220. This allows the pitch of each of the blades 112 to be controlled. For instance, each blade 112 is able to rotate clockwise or counterclockwise as indicated by arrow 228 about an axis of rotation 230 that runs along the length of each blade 112.

Figure 3:
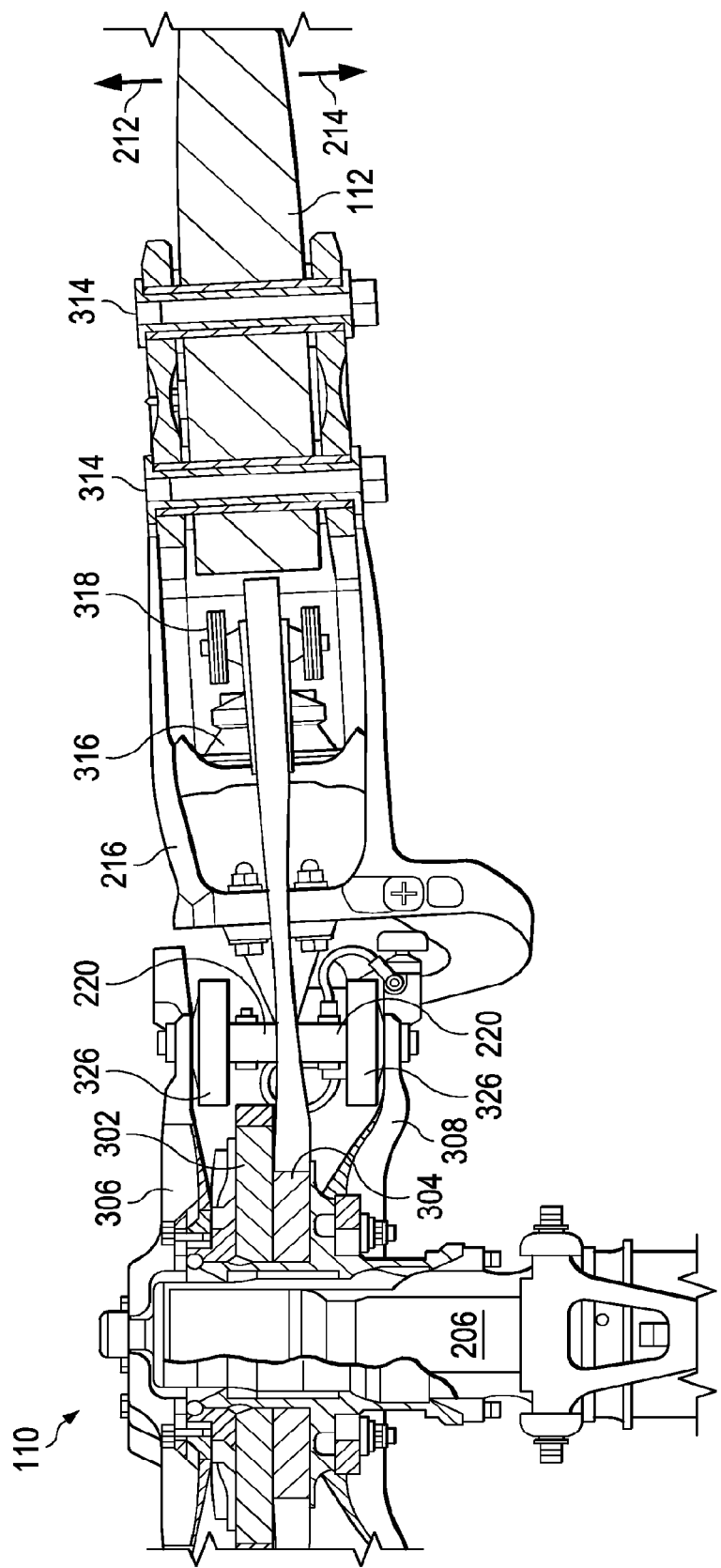
FIG. 3 is a cross-sectional view of a main rotor assembly according to an embodiment of the disclosure.

FIG. 3 is a cross-sectional view of one blade 112 of main rotor assembly 110. Main rotor assembly 110 includes a top yoke 302 and a bottom yoke 304 that are disposed between and supported by a top mast adapter 306 and a bottom mast adapter 308. Top mast adapter 306 and/or bottom mast adapter 308 may translate rotational movement from mast 206 to the other components of rotor assembly 110.

Blade 112 is attached to yoke 304 through a main rotor grip 216. An outboard section of main rotor grip 216 includes one or more apertures 314 or other attachment mechanisms that attach to blade 112. The main rotor grip 216 is attached to yoke 304 through a centrifugal force (CF) bearing 316 and a CF fitting 318. CF bearing 316 optionally allows blade 112 to articulate relative to yoke 304. For instance, CF bearing 316 may allow blade 112 to flap up in the direction indicated by arrow 212 and flap down in the direction indicated by arrow 214. Also for instance, CF bearing 316 may allow relative motion between main rotor grip 216 and yoke 304.

An inboard section of main rotor grip 216 may include a spindle that fits within a shear bearing 220. Shear bearing 220 in combination with CF bearing 316 allows main rotor grip 216 to rotate such that the angle of attack of blade 112 can be changed. Shear bearing 220 is disposed between two lead/lag dampers 326, and shear bearing 220 and lead/lag dampers 326 are held in place and supported by top mast adapter 306 and bottom mast adapter 308.

Figure 4:
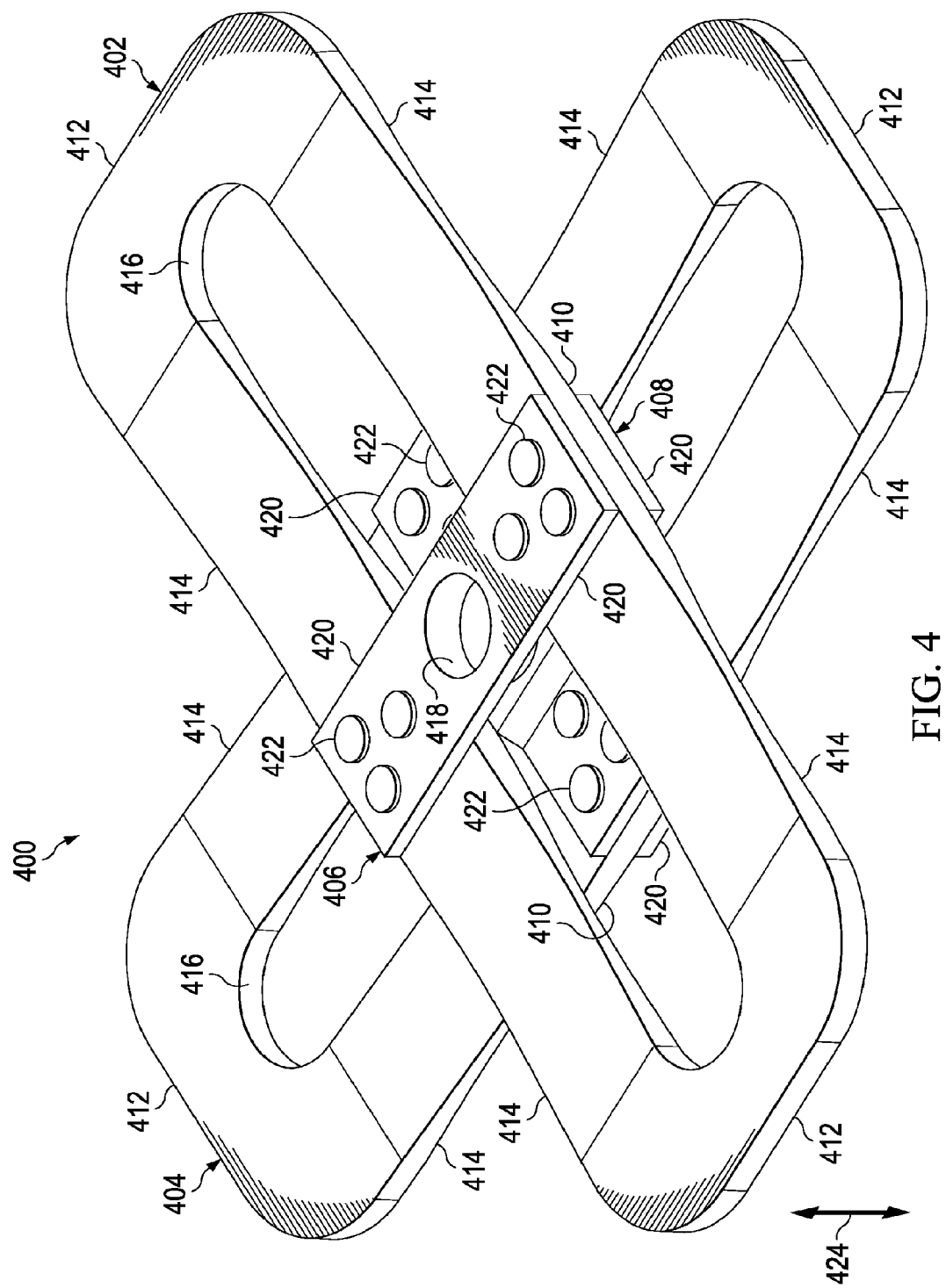
FIG. 4 is a perspective view of a composite rotor system according to an embodiment of the disclosure.

FIG. 4 is a perspective view of a composite rotor system 400. Rotor system 400 may be included in a rotor assembly such as in the rotor assemblies shown in FIGS. 1-3. However, embodiments are not limited to any particular setting or application and can be used in settings and applications different than the particular examples shown in FIGS. 1-3.

Rotor system 400 includes a top yoke 402 that is stacked upon a bottom yoke 404. The two stacked yokes 402 and 404 are disposed between and held into place by a top mast adapter 406 and a bottom mast adapter 408. Generally, one yoke supports two rotor blades, but other yoke arrangements (e.g., triangular) could support additional rotor blades (e.g., three).

Each yoke 402 and 404 is optionally a race track style yoke having an annular shape and is made of a composite material such as, but not limited to, fiberglass and/or carbon fiber. Additionally, each yoke 402 and 404 may have a mast or inboard section 410, an end or outboard section 412, flexure sections 414 extending between inboard sections 410 and outboard sections 412, and a central aperture 416.

Each mast adapter 406 and 408 is optionally a cruciform mast adapter having a central aperture 418 that is configured to accommodate a mast and four arms 420 extending outward from central aperture 418. Additionally, each arm 420 may include one or more apertures 422 or other attachment mechanisms for attaching mast adapters 406, 408 and yokes 402, 404 together. Mast adapters 406 and 408 may be made of a rigid material such as a metal (e.g., steel). The rigid material illustratively restricts out-of-plane movement and in-plane torsional movement (e.g., the rigid material restricts relatively all torsional deflections). Mast adapters 406 and 408 are not however limited to any particular material and may be made of other materials as well.

In an embodiment, yoke flexure sections 414 are configured to flap up and down in the directions indicated by arrow 424. As can be seen in FIG. 4, neither mast adapter 406 nor mast adapter 408 obstructs any portion of flexure sections 414 in the flapping directions as indicated by arrow 424. Instead, each mast adapter arm 420 connects to one yoke inboard section 410 and fits within the central aperture 416 of the other yoke. In at least certain circumstances, this increases a length of the yoke that can flap without increasing an overall length of the yokes 402 and 404. Since the yoke can flex a certain amount per unit length and the length of the yoke that can flap is increased, yoke outboard sections 412 are able to flap to greater angles.

Figure 5:
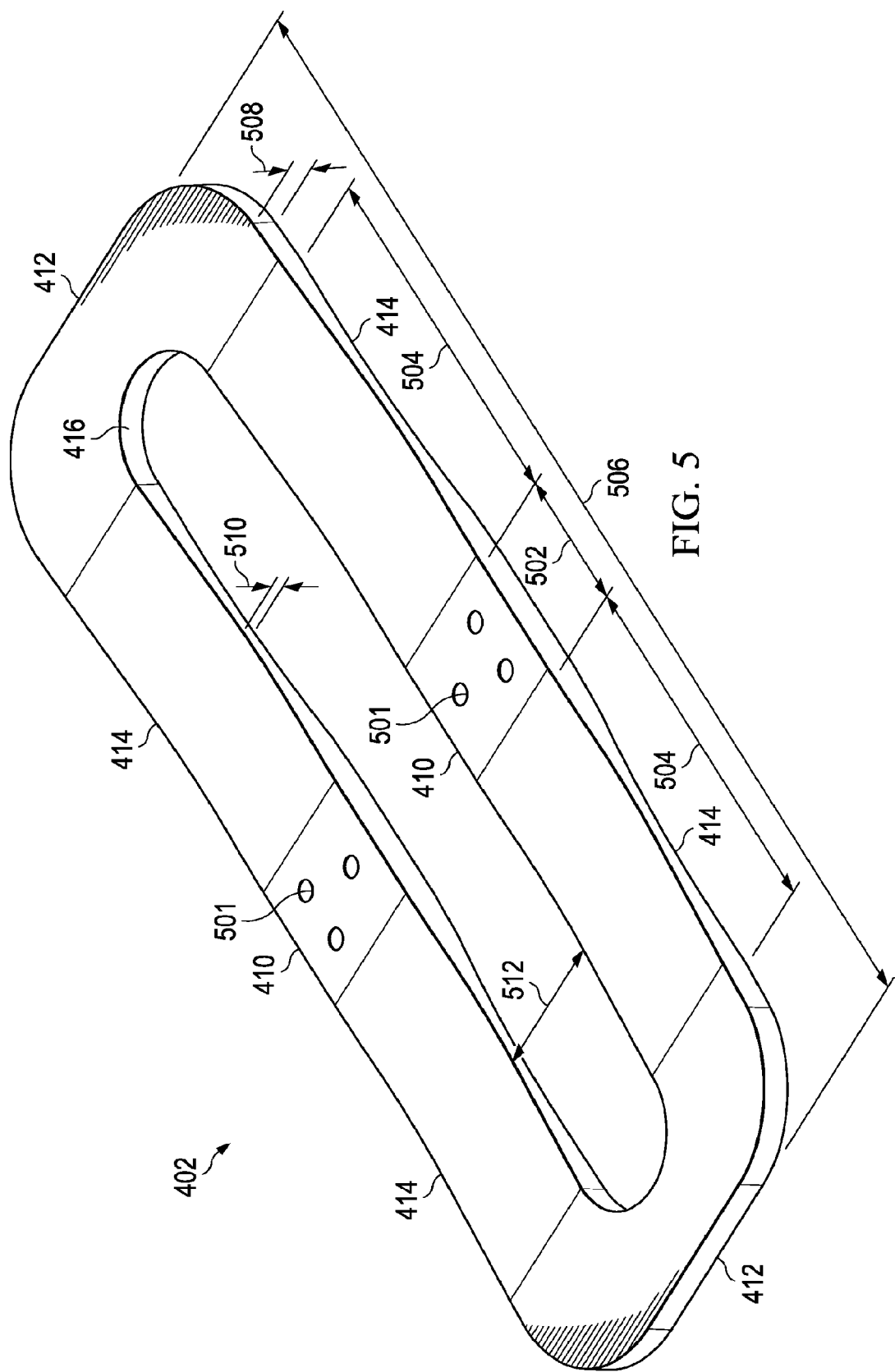
FIG. 5 is a perspective view of a yoke according to an embodiment of the disclosure.

FIG. 5 is a perspective view of yoke 402 from FIG. 4 by itself. In an embodiment, yokes 402 and 404 in FIG. 4 may be the same or approximately the same. However, yokes 402 and 404 could be configured differently from each other.

As previously mentioned, yoke 402 includes mast or inboard sections 410, outboard sections 412, flexure sections 414, and aperture 416. Additionally, FIG. 5 shows that inboard sections 410 may have one or more apertures 501 or other attachment mechanisms for attaching yoke 402 to another yoke and/or mast adapters 406 and 408 (shown and labeled in FIG. 4). Furthermore, FIG. 5 shows that inboard sections 410 have a length 502, that flexure sections 414 have lengths 504, that yoke 402 has an overall length 506, that inboard sections 410 and outboard sections 412 have a thickness 508, that flexure sections 414 have a thickness 510, and that aperture 416 has a width 512.

In an embodiment, the flexure section thickness 510 is less than the inboard and outboard section thickness 508. This enables flexure sections 414 to be relatively flexible and be able to flap, while the inboard sections 410 and outboard sections 412 are relatively rigid such that they can support secure attachments to a mast, main rotor grip, etc. Additionally, as previously noted, the design of the rotor system in at least certain embodiments enables the flexure section length 504 to be relatively long compared to the yoke overall length 506 enabling yoke 402 to achieve greater flapping angles.

Figure 6:
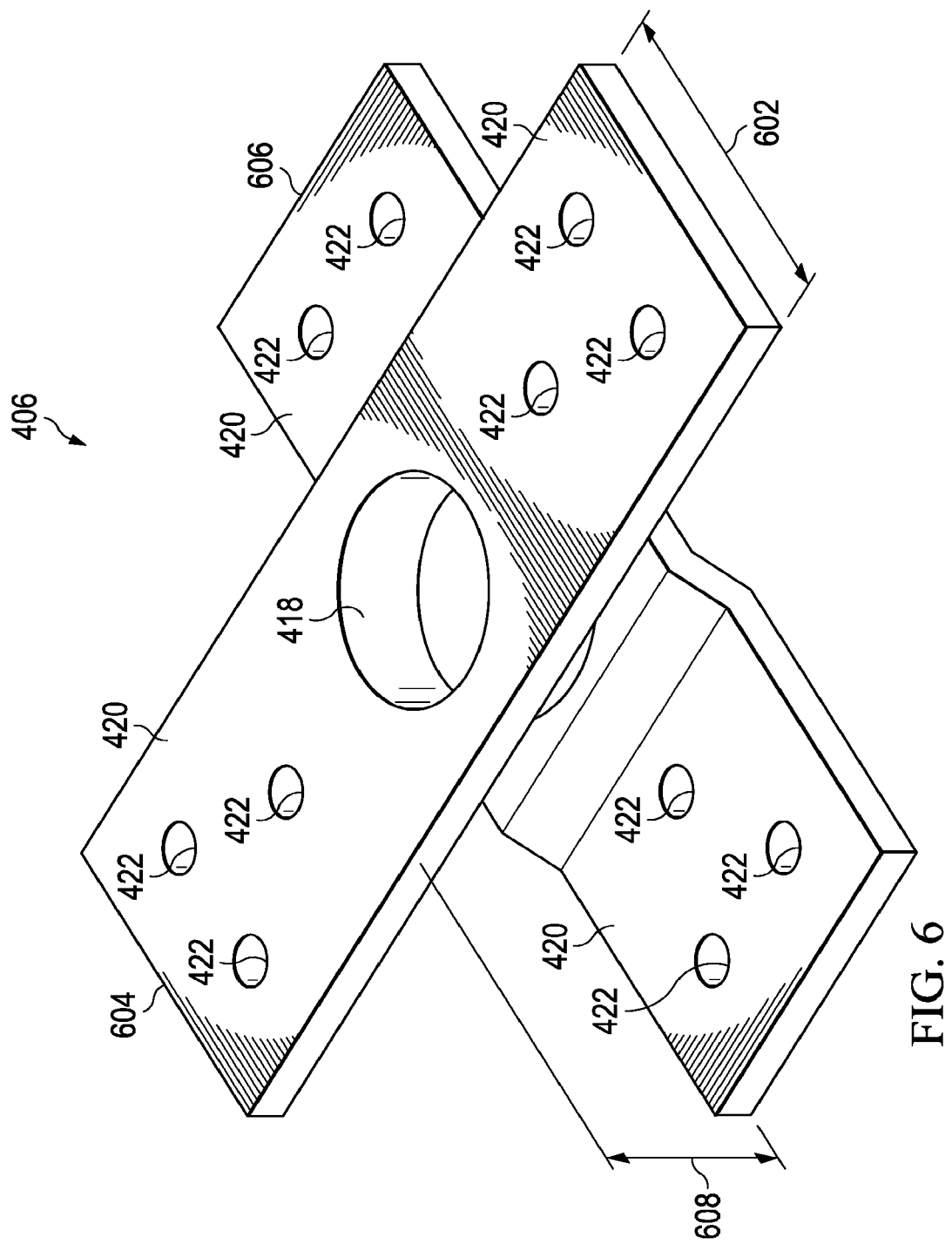
FIG. 6 is a perspective view of a single mast adapter according to an embodiment of the disclosure.

FIG. 6 is a perspective view of mast adapter 406 from FIG. 4 by itself. In an embodiment, mast adapters 406 and 408 in FIG. 4 may be the same or approximately the same. However, mast adapters 406 and 408 could be configured differently from each other.

Mast adapter 406 includes a central aperture 418, arms 420, and arm apertures 422. In the particular 4-bladed embodiment shown in FIG. 6, mast adapter 406 includes four arms 420 (e.g., one arm 420 for each blade). However, embodiments are not limited to any number of arms 420 and can include any number or arms 420 depending on the number of blades. In one embodiment, each arm has a width 602, and arm width 602 is approximately the same or less than the yoke mast or inboard section length 502 (shown and labeled in FIG. 5) such that arms 420 do not extend into the yoke flexure sections 414 (shown and labeled in FIGS. 4-5). Furthermore, each arm width 602 is less than yoke aperture width 512 (shown and labeled in FIG. 5) such that arms 420 fit within yoke apertures 416 (shown and labeled in FIGS. 4-5). These relative dimensions enable mast adapter 406 to be able to support yokes without interfering with yoke flapping.

Additionally, FIG. 6 shows that mast adapter arms 420 may include two sets of opposing arms that are perpendicular or approximately perpendicular to each other for a 4-bladed rotor system. In an embodiment, the first set of opposing arms lie within a first plane at a first level 604, and the second set of opposing arms lie within a second plane at a second level 606. First level 604 and second level 606 are optionally parallel and are offset in a vertical direction 608. This enables mast adapter arms 420 to be able to contact and attach to two stacked yokes that are at different levels.

Figure 7:
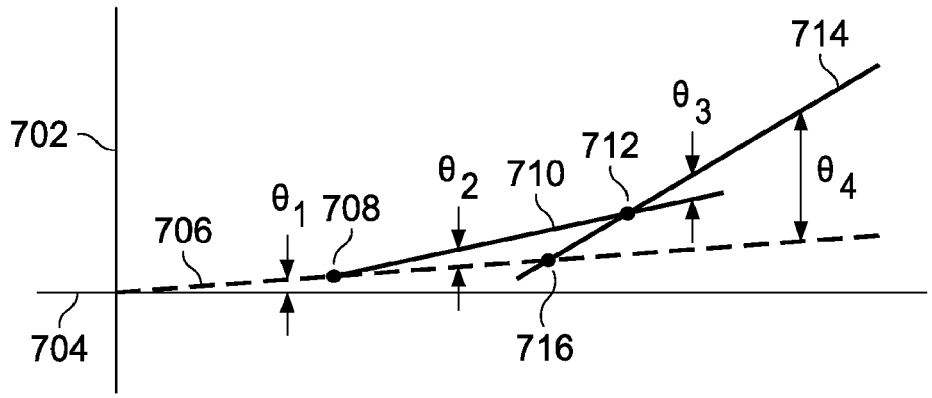
FIG. 7 is a schematic diagram of flapping angles according to an embodiment of the disclosure.

FIG. 7 is a schematic diagram of flapping angles according to an embodiment of the disclosure. Line 702 represents the axis of rotation of a mast (e.g., axis of rotation 114 in FIG. 1), and line 704 is perpendicular to line 702. Line 704 represents the position of the rotor hub assembly, and the various lines in FIG. 7 show the flapping angles and positions relative to line 704. Line 706 represents a precone or initial position of a yoke and is at an angle $\theta_1$ with respect to line 704. Point 708 represents a yoke virtual hinge point, which may be a single point or a range of locations simplified to a single point for the purpose of flapping analysis. Line 710 represents a tangency to the outboard end of the flapped portion of the yoke (e.g., the flexure section). Line 710 is at an angle $\theta_2$ with respect to line 706. Point 712 represents a flapping or hinge point of a rotor blade (e.g., a CF bearing), and line 714 represents the actual rotor blade flapping position. Line 714 passes through point 716. Point 716 represents the shear bearing pivot point, which is fixed in position relative to lines 702 and 704. Line 714 is at an angle $\theta_3$ with respect to line 710. The total flapping angle of the blade relative to the precone position is the sum of $\theta_2$ and $\theta_3$ which is $\theta_4$. In some cases, $\theta_2$ is approximately 4.5°, $\theta_3$ is approximately 1.5°, and θ$_4$ is approximately 6.0°. However, embodiments are not limited to any specific flapping angles.

In at least some embodiments of the disclosure, the yoke virtual hinge point 708 is located closer to the mast axis of rotation 702 as compared to rotor systems having different designs (e.g., the yoke virtual hinge point 708 is located between the blade flapping point 712 and the mast 702). For instance, the yoke virtual hinge 708 may be located at station 2.0 which is 2 inches away from the center of the mast. This extends the flapped yoke length 710 which increases the total flapping angle θ$_4$. In rotor systems having different designs, the yoke hinge point 708 may be further outboard. For example, in at least some other rotor systems, the yoke hinge point 708 may coincide with the blade flapping point 716, which results in a reduced amount of flapping (e.g., θ$_4$ is not greater than θ$_2$). Accordingly, embodiments of the disclosure can be advantageous in being able to provide a greater blade flapping angle θ$_4$.

Figure 8:
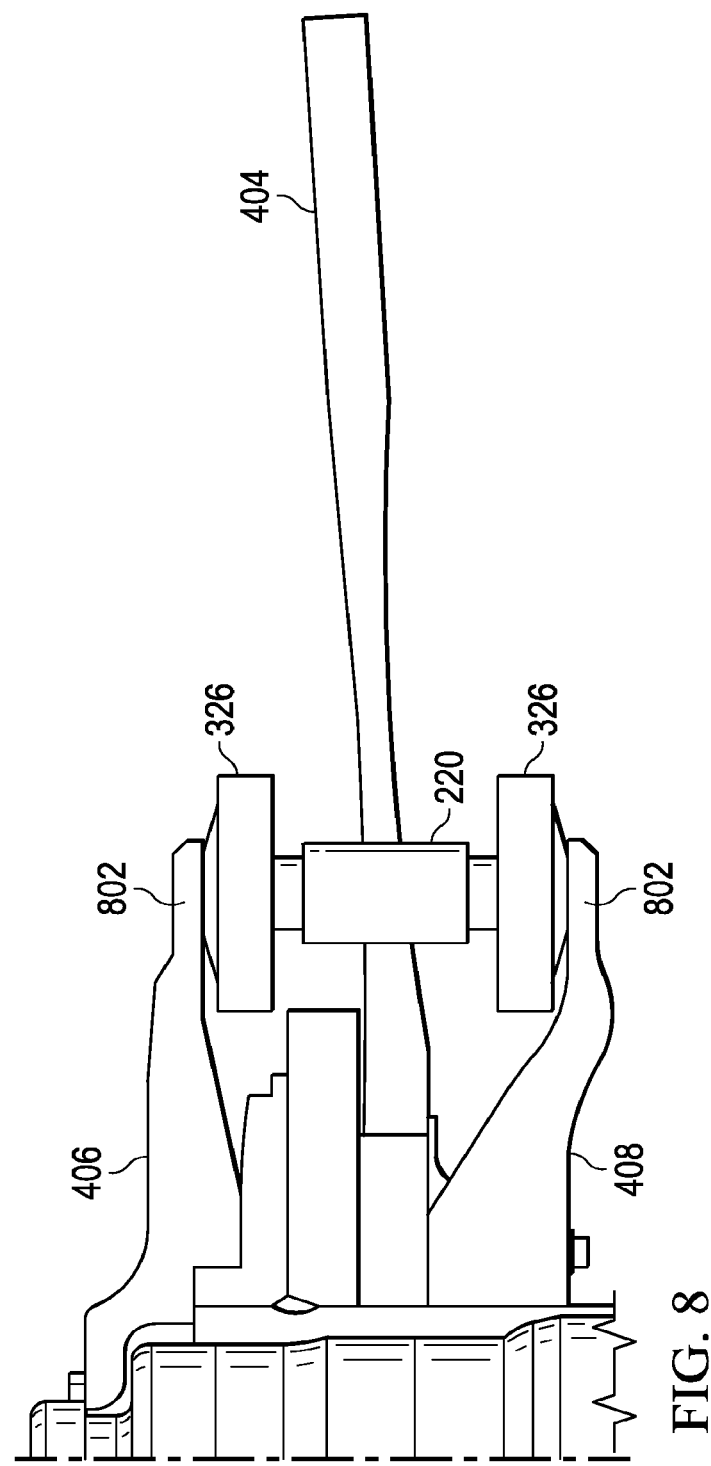
FIG. 8 is a cross-sectional view of damper mounts according to an embodiment of the disclosure.

FIG. 8 is a side cross-sectional view of damper mounts 802 that may optionally be included within a rotor system. In an embodiment, damper mounts 802 are integrally formed with mast adapters 406 and 408. For instance, one damper mount 802 may extend from each of the arms of a mast adapter (e.g., from each of mast adapter arms 420 in FIGS. 4 and 6). Damper mounts 802 are configured to secure lead/lag dampers 326 in place, which in turn support a shear bearing 220. Damper mounts 802 can fit within an aperture (e.g., aperture 416 in FIGS. 4-5) of a yoke 404, thus damper mounts 802 can be included within mast adapters 406 and 408 without obstructing the yoke flapping.

Figure 9:
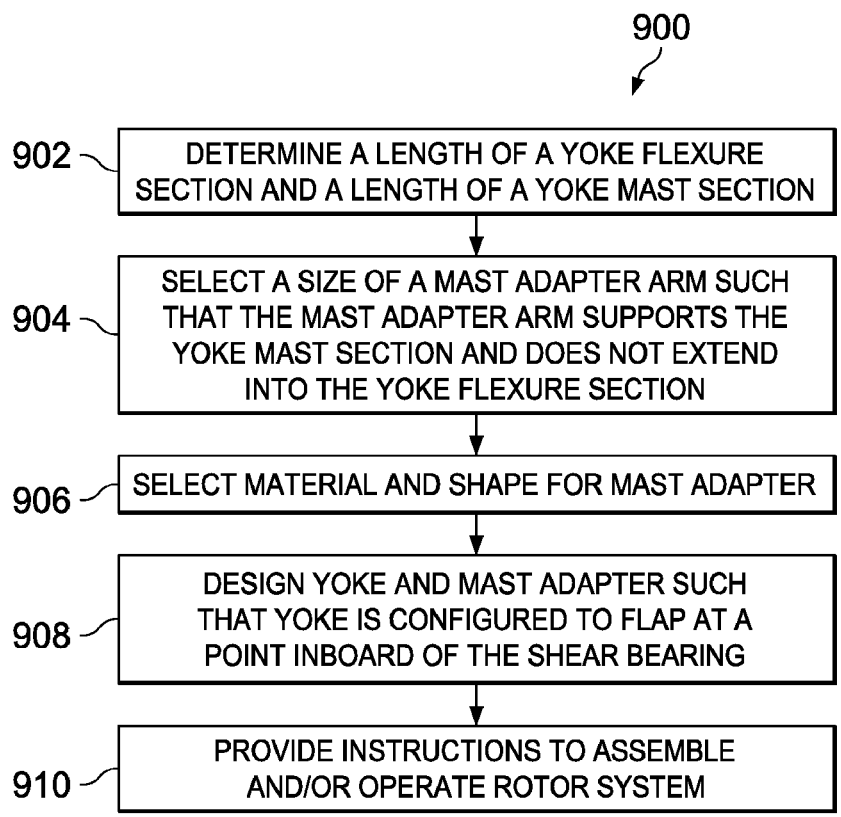
FIG. 9 is a flowchart illustrating a method for enhancing the flapping of rotor blades according to an embodiment of the disclosure.

FIG. 9 is a flowchart illustrating a method 900 of enhancing flapping of rotor blades. At block 902, a length of a yoke flexure section and a length of a yoke mast section are determined. At block 904, a size of a mast adapter arm is selected such that the mast adapter arm supports the yoke mast section and does not extend into the yoke flexure section. At block 906, a material and/or a shape for the mast adapter is selected. The material and/or shape may be selected such that the mast adapter limits out-of-plane, in-plane, and torsional movement. The material and/or shape may also be selected to eliminate "potato chipping" and/or control interlaminar shear (ILS) stress in the yokes. At block 908, the yoke and mast adapter are designed such that the yoke is configured to flap at a point inboard of a shear bearing (e.g., a flapping point or virtual hinge that is located between a shearing bearing and a mast section of the flexible yoke). Then, at block 910, instructions are provided to assemble and/or operate a rotor system. For instance, the instructions may include instructions to attach a rotor blade to a blade gripping bearing, attach the blade gripping bearing to an outboard end of a flexible yoke, and attach a mast section of the flexible yoke to a mast adapter. The instructions for operating the rotor system may include instructions to flap the flexible yoke at an inboard flapping point that enables the rotor blade to flap to a greater angle (e.g., a greater angle θ$_4$ in FIG. 7).

FIG. 10 is a perspective view of a composite rotor system 1000. Similar to composite rotor system 400 in FIG. 4, composite rotor system 1000 also includes a top yoke 1002, a bottom yoke 1004, a top mast adapter 1006, a bottom mast adapter 1008, and mast adapter arms 1020. However, as can be seen in FIG. 10, mast adapter arms 1020 have an I-shaped cross-sectional shape instead of the rectangular cross-sectional shape shown in FIG. 4. In particular, each mast adapter arm 1020 includes an inner flange 1021, an outer flange 1022, and a web 1023. Each inner flange 1021 is configured to attach to and support a mast section of one of the yokes 1002 or 1004. Each web 1023 connects inner flange 1021 to outer flange 1022, and each outer flange 1022 is connected to a mast sleeve 1030 that is configured to accommodate a mast (e.g., mast sleeve 1030 may have a splined inner surface that is configured to attach composite rotor system 1000 to a rotor mast).

In an embodiment, each inner flange 1021 has an inboard section 1024 that is not connected to any other portion of a mast adapter 1006 or 1008. This feature, in combination with the I-shaped cross-sectional shape, may enable mast adapters 1006 and 1008 to accommodate a greater amount of flapping. For instance, in FIG. 10, the inner flanges 1021 of top mast adapter 1006 and bottom mast adapter 1008 that are attached to top yoke 1002 are able to rotate (e.g., pivot) about axis of rotation 1040 in the directions indicated by arrow 1042. This enables top yoke 1002 to be able to flap to a greater angle. Bottom yoke 1004 is similarly disposed between and supported by inner flanges 1021 that enable the bottom yoke 1004 to potentially flap to a greater angle. In one particular example, the I-shaped arms 1020 enable a yoke to flap an extra 1° as compared to the rectangular shaped arms 420 in FIG. 4. However, embodiments are not limited to any particular angles. Furthermore, the I-shaped arms 1020 may also be beneficial in reducing ILS stress in the yokes 1002 and 1004. For instance, the pivoting/rotating inner flanges 1021 allow for out-of-plane deflections that absorb some of the stress that would normally go into the yoke.

Figure 11:
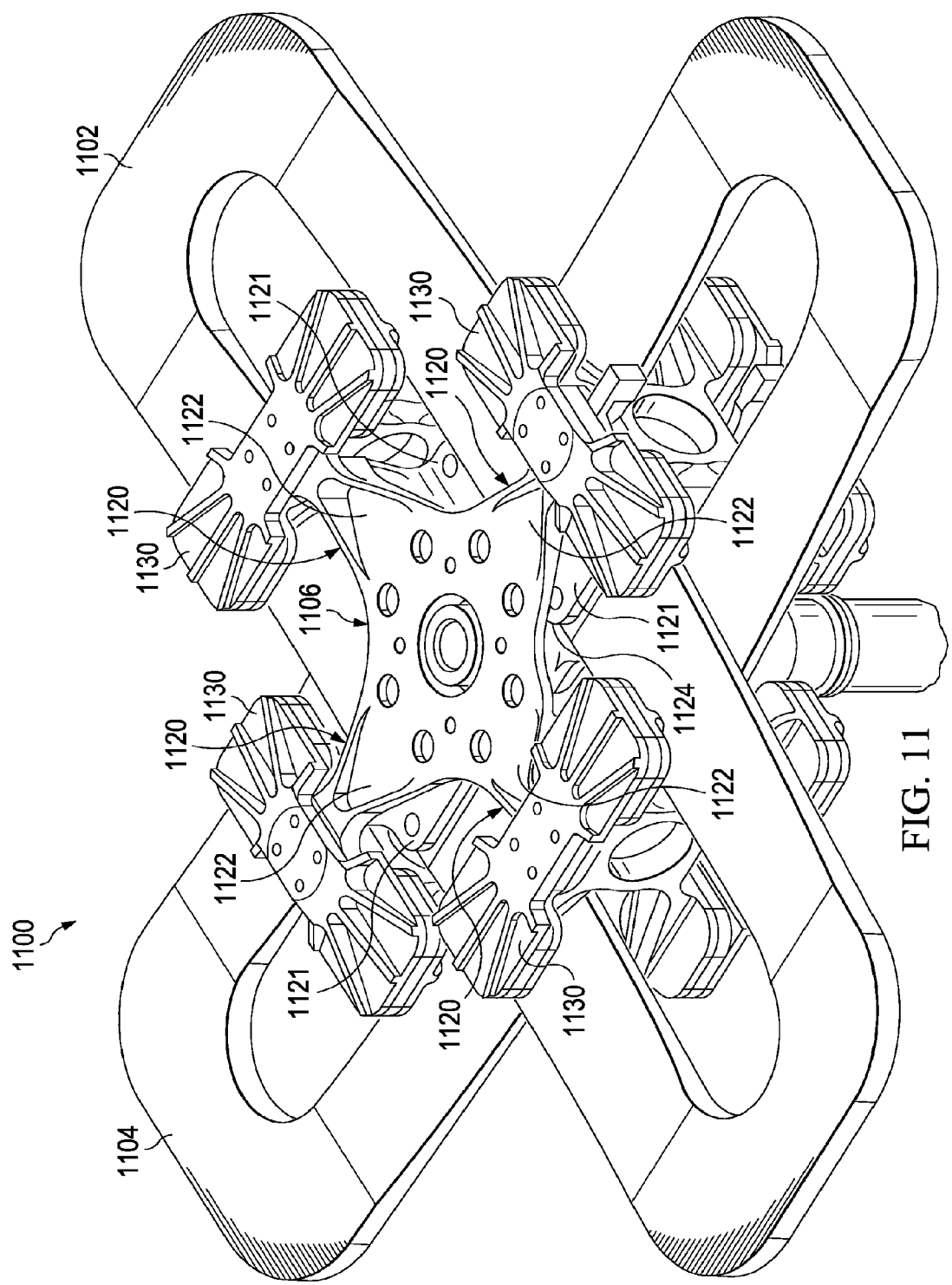
FIG. 11 is a perspective view of a composite rotor system having I-shaped arms and damper mounts according to an embodiment of the disclosure.

FIG. 11 is a perspective view of a composite rotor system 1100. Similar to composite rotor system 1000 in FIG. 10, composite rotor system 1100 also includes I-shaped mast adapter arms 1120. From the view shown in FIG. 10, only one mast adapter 1106 is visible. However, it should be noted that in an embodiment that rotor system 1100 includes both a top and a bottom mast adapter similar to the configurations shown in FIGS. 4 and 10.

Each mast adapter 1106 includes a number of I-shaped arms 1120. Each arm includes an inner flange 1121, an outer flange 1122, and a web (hidden in FIG. 11) that connects inner flange 1121 and outer flange 1122. Each inner flange 1121 is configured to attach to and support a yoke 1102 or 1004. Additionally, each inner flange 1121 has an inboard section 1124 that is not connected to any other portion of mast adapter 1106. Accordingly, inner flanges 1121 are able to pivot/rotate similarly to inner flanges 1021 in FIG. 10, which enables yokes 1102 and 1104 to flap to potentially greater angles.

As can be seen in a comparison of FIGS. 10 and 11, mast adapters 1006 and 1008 in FIG. 10 have a cruciform shape while mast adapter 1106 in FIG. 11 has a roughly diamond or star shape. This shows that embodiments of the disclosure are not limited to any particular shape or configuration and that embodiments can be implemented in a number of different fashions.

Additionally, mast adapter 1106 in FIG. 11 shows one potential method of supporting damper mounts 1130. In particular, the outboard end of each mast adapter arm 1120 can be configured to attach to and support a damper mount 1130. Alternatively, damper mounts 1130 could be integrally formed with mast adapter arms 1120 such that at least a portion of damper mounts 1130 and mast adapter arms 1120 are made from a same piece of material. Furthermore, it should be noted that the damper mount configuration shown in FIG. 11 is designed to not obstruct yoke flapping. Accordingly, damper mounts 1130 can optionally be included within composite rotor systems of the present disclosure without interfering with yoke flapping.

Figure 12:
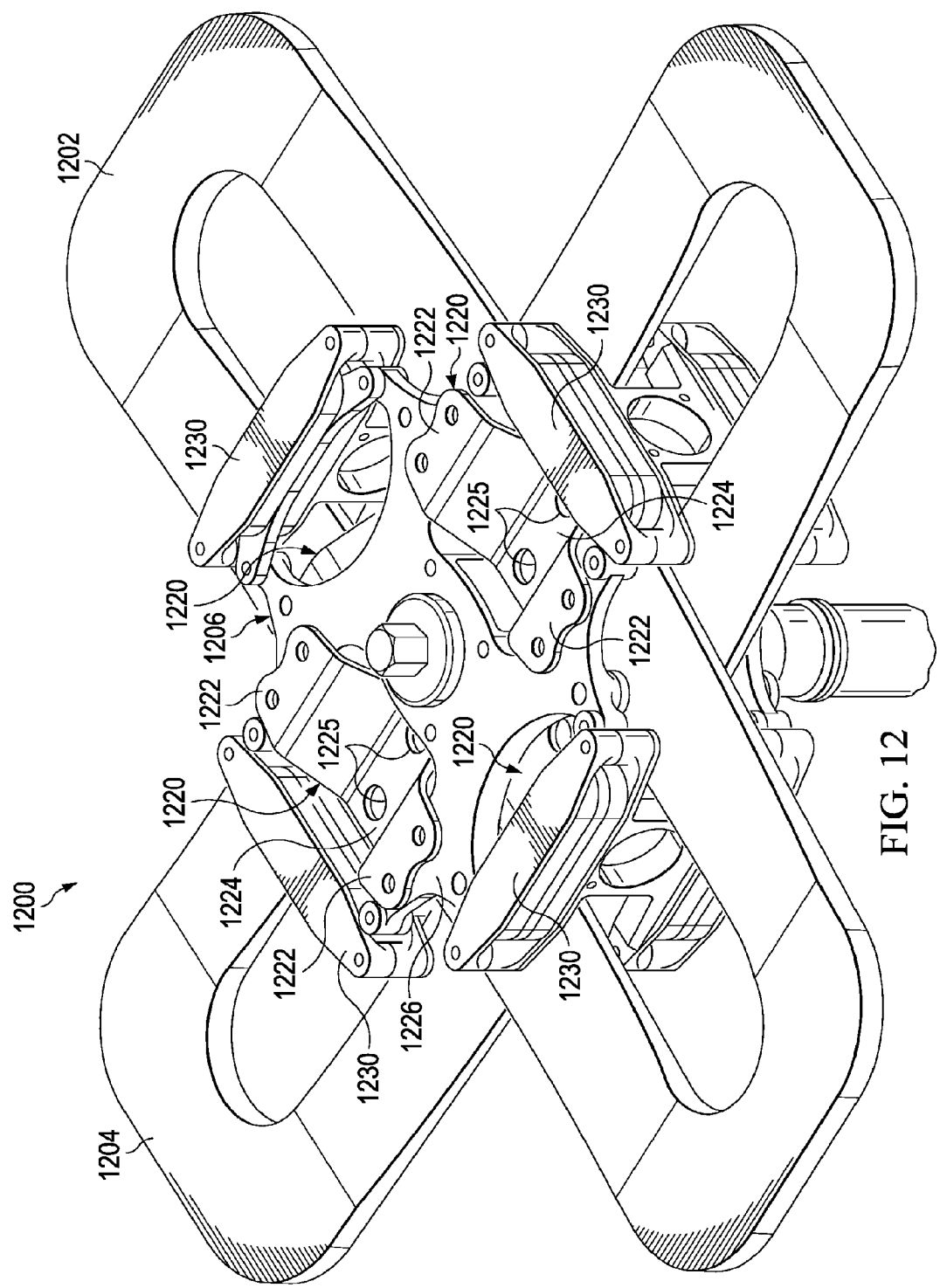
FIG. 12 is a perspective view of a composite rotor system having V-shaped arms according to an embodiment of the disclosure.

FIG. 12 is a perspective view of a composite rotor system 1200. Composite rotor system 1200 functions similarly to composite rotor systems 1000 in FIGS. 10 and 1100 in FIG. 11. However, instead of using I-shaped arms to support yokes, composite rotor system 1200 uses V-shaped arms 1220 to support yokes 1202 and 1204. It should also be noted that similar to FIG. 10, the view shown in FIG. 11 only shows one mast adapter 1206. Embodiments of composite rotor system 1200 illustratively include both a top and a bottom mast adapter. Also, it should be noted that FIG. 11 shows that composite rotor system 1100 only contains I-shaped arms and that FIG. 12 shows that composite rotor system 1200 only contains V-shaped arms, that embodiments are not limited to only having I-shaped or V-shaped arms. In other embodiments, a composite rotor system may include a combination of I-shaped and V-shaped arms, may have other shaped arms (e.g., not I-shaped or V-shaped), or may have any combination of I-shaped, V-shaped, and other shaped arms.

Each V-shaped arm 1220 includes two top portions 1222, a bottom portion 1224, and sidewalls connecting the top portions 1222 and the bottom portion 1224. Top portions 1222 are configured to be attached to and supported by a support plate 1226 of mast adapter 1206. In the particular example shown in FIG. 12, support plate 1226 and V-shaped arms 1220 are separate pieces. However, in another embodiment, support plate 1226 and V-shaped arms 1220 may be integrally formed as one piece. In an embodiment where support plate 1226 and V-shaped arms 1220 are formed as one piece, support plate 1226 and V-shaped arms 1220 may be made from a metal (e.g., 6Al-4V titanium alloy). In an embodiment where support plate 1226 and V-shaped arms 1220 are formed as separate pieces, support plate 1226 may be made of a metal (e.g., 6Al-4V titanium allow), and V-shaped arms 1220 may be made of a composite material (e.g., fiberglass, carbon fiber, or IM7/8552 carbon/epoxy laminate). Embodiments are not however limited to any particular configuration or materials.

In composite rotor system 1200, a mast or center section of each yoke 1202 and 1204 is disposed between and supported by two V bottom portions 1224. Bottom portions 1224 are configured to rotate or pivot the same or similarly to how the inner flanges 1021 and 1121 of the I-shaped arms in FIGS. 10 and 11 are configured to rotate or pivot. This allows yokes 1202 and 1204 to flap to greater angles and also possibly absorb some of the ILS stress in yokes 1202 and 1204. Furthermore, it should be noted that the V bottom portions 1224 may have one or more apertures or other attachment mechanisms 1225 that are configured to attach to the center or about the center of yokes 1202 and 1204 (e.g., apertures 1225 that connect to station 0.0 of yokes 1202 and 1204). This may be useful in preventing or reducing delamination of yokes 1202 and 1204. For instance, in at least certain circumstance, the center of the yoke (e.g., station 0.0) may have less stress than portions of the yoke further away from the center. Accordingly, by being able to put attachment holes/apertures in the center of the yoke, the attachment holes/apertures experience less stress and are less likely to delaminate. This may reduce maintenance time and costs associated with having to repair or replace yokes because of delamination issues.

FIG. 12 further shows that the V-shaped composite rotor system 1200 can also be configured to support damper mounts 1230. Again, damper mounts 1230 can be configured to be attached to and supported by mast adapter 1206 or can be integrally formed with mast adapter 1206. Also, damper mounts 1230 may be integrated within composite rotor system 1200 such that they do not obstruct yoke flapping.

Figure 13A:
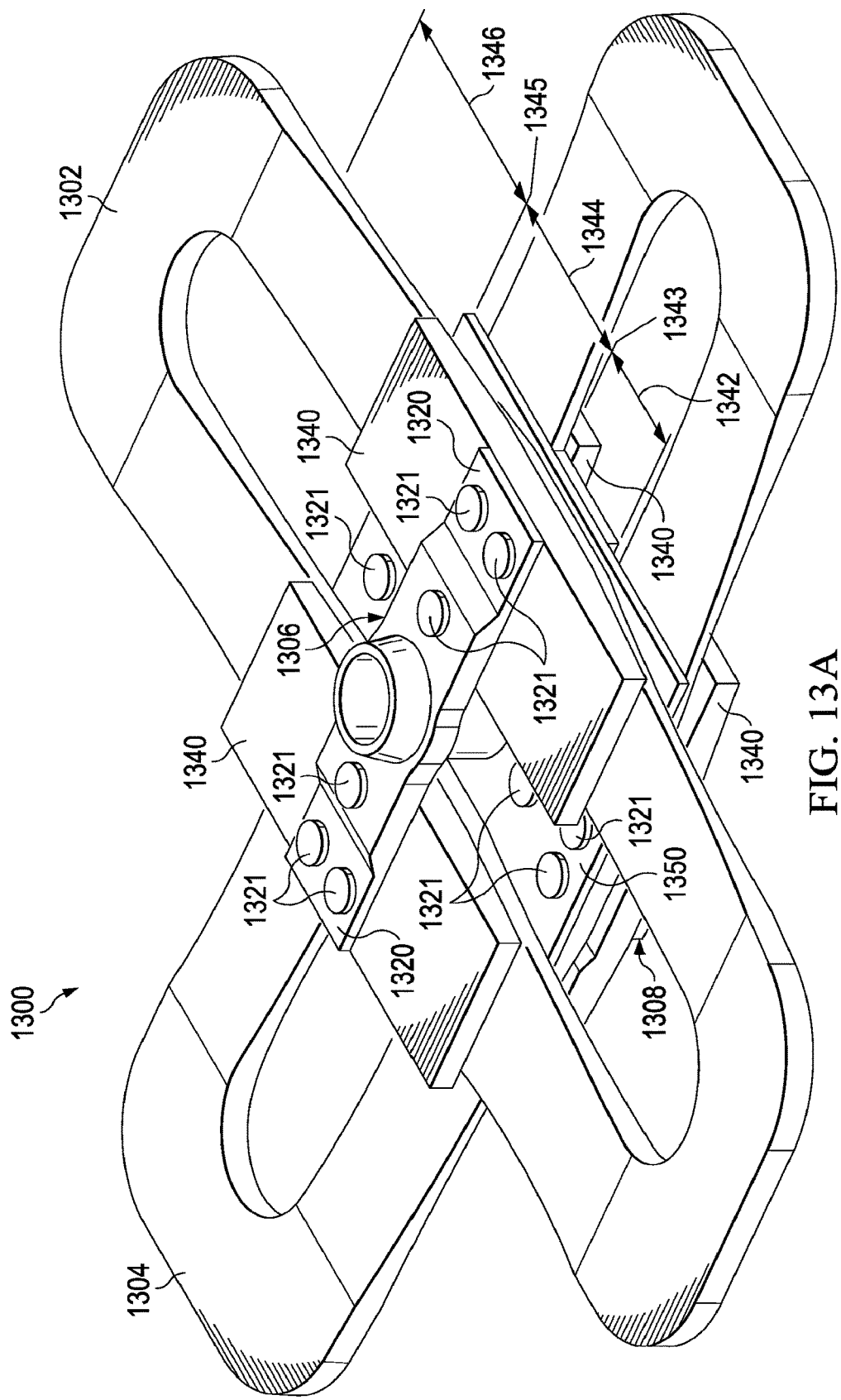
FIG. 13A is a perspective view of a composite rotor system having composite plate leaf springs according to an embodiment of the disclosure.

FIG. 13A is a perspective view of a composite rotor system 1300. Composite rotor system 1300 includes a top yoke 1302, a bottom yoke 1304, a top mast adapter 1306, a bottom mast adapter 1308, four leaf springs 1340, and a middle plate 1350. In an embodiment, middle plate 1350 is placed in between top yoke 1302 and bottom yoke 1304. Then, as is shown in FIG. 13A, leaf springs 1340 are placed on the sides of yokes 1302 and 1304 opposite middle plate 1350. The yokes 1302, 1304, mast adapters 1306, 1308, leaf springs 1340, and middle plate 1350 are then connected or attached together by using through bolts or other attachment mechanisms 1321 that are placed through apertures in arms 1320 of the mast adapters 1306, 1308, yokes 1302, 1304, and middle plate 1350

In an embodiment, leaf springs 1340 and/or middle plate 1350 are rectangularly shaped plates made of a composite material (e.g., fiberglass or carbon fiber). However, embodiments of leaf springs 1340 and middle plate 1350 are not limited to any particular shapes or materials.

In at least some circumstances, leaf springs 1340 and middle plate 1350 may be able to increase flapping angles by creating an additional pivot point or hinge point that enables greater yoke flapping. For instance, as shown in FIG. 13A, leaf springs 1340 and middle plate 1350 divide each yoke 1302 and 1304 into three different sections 1342, 1344, and 1346. In section 1342, each yoke 1302 or 1304 is supported by a mast adapter arm 1320, a leaf spring 1340, and middle plate 1350. In section 1344, each yoke 1302 or 1304 is supported only by a leaf spring 1340 and middle plate 1350. In section 1346, each yoke 1302 and 1304 is not supported by a mast adapter arm 1320, a leaf spring 1340, or middle plate 1350.

Yoke section 1342 is essentially held firmly in place and is not able to flap because it is being constrained by a mast adapter arm 1320 and middle plate 1350. Then, as the yoke 1302 or 1304 reaches section 1344, yoke 1302 or 1304 is able to flap because it is only being supported by a leaf spring 1340 and middle plate 1350. In particular, yoke 1302 or 1304 will have a pivot point or a hinge point 1343 between sections 1342 and 1344. Yoke section 1344 is able to flap up or down about pivot point or hinge point 1343. Then, as the yoke 1302 or 1304 reaches section 1346, yoke 1302 or 1304 is able to flap an additional amount because it is not supported by a leaf spring 1340, a mast adapter arm 1320, or middle plate 1350. In particular, yoke 1302 or 1304 will have another pivot point or hinge point 1345 between sections 1344 and 1346. Yoke section 1346 is able to flap up or down about pivot point or hinge point 1345. Accordingly, instead of a yoke in a composite rotor system only having one pivot point or hinge point, the use of leaf springs 1340 and middle plate 1350 enables a yoke to have two pivot points or hinge points (e.g., points 1343 and 1345) that enable the yoke to flap to a greater flapping angle. Additionally, embodiments of leaf springs 1340 and middle plate 1350 may also be beneficial in reducing the intensity of strains at any particular location of a yoke by more evenly distributing the strain throughout a larger portion of the yoke.

Figure 13B:
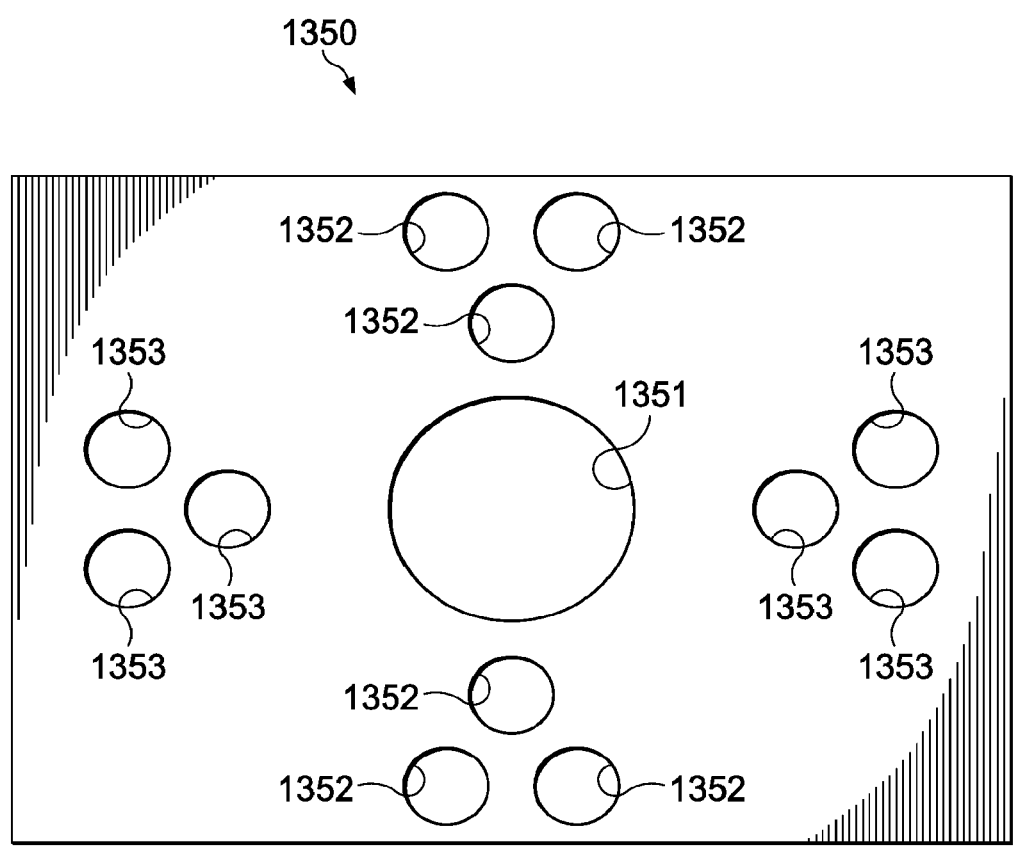
FIG. 13B is a top down view of a middle plate that may be used in the composite rotor system of FIG. 13A according to an embodiment of the disclosure.

FIG. 13B is a top down view of middle plate 1350 from FIG. 13A by itself. As previously mentioned, middle plate 1350 is optionally placed between a pair of stacked yokes (e.g., yokes 1302 and 1304 in FIG. 13A). As shown in FIG. 13B, middle plate 1350 may have a rectangular shape. However embodiments are not limited to any particular shape, and middle plate 1350 could have a shape or configuration different than the specific example shown in FIG. 13B. Additionally, middle plate 1350 may include a number of apertures or other attachment mechanisms such that middle plate 1350 can be connected to or attached to yokes (e.g., yokes 1302 and 1304 in FIG. 13A) and/or mast adapter arms (e.g., mast adapter arms 1320 in FIG. 13A). In the particular example, shown in FIG. 13B, middle plate 1350 includes a central aperture 1351 configured to accommodate a rotor mast, a first set of opposing apertures 1352 configured to attach to a first yoke, and a second set of opposing apertures 1353 configured to attach to a second yoke. Each group of apertures in the sets of opposing apertures 1352 and 1353 may include three apertures arranged in a triangular manner as is shown in FIG. 13B. However, embodiments are not limited to any particular number or configuration of apertures, and embodiments can include different numbers of apertures and different configurations of apertures.

Figure 14:
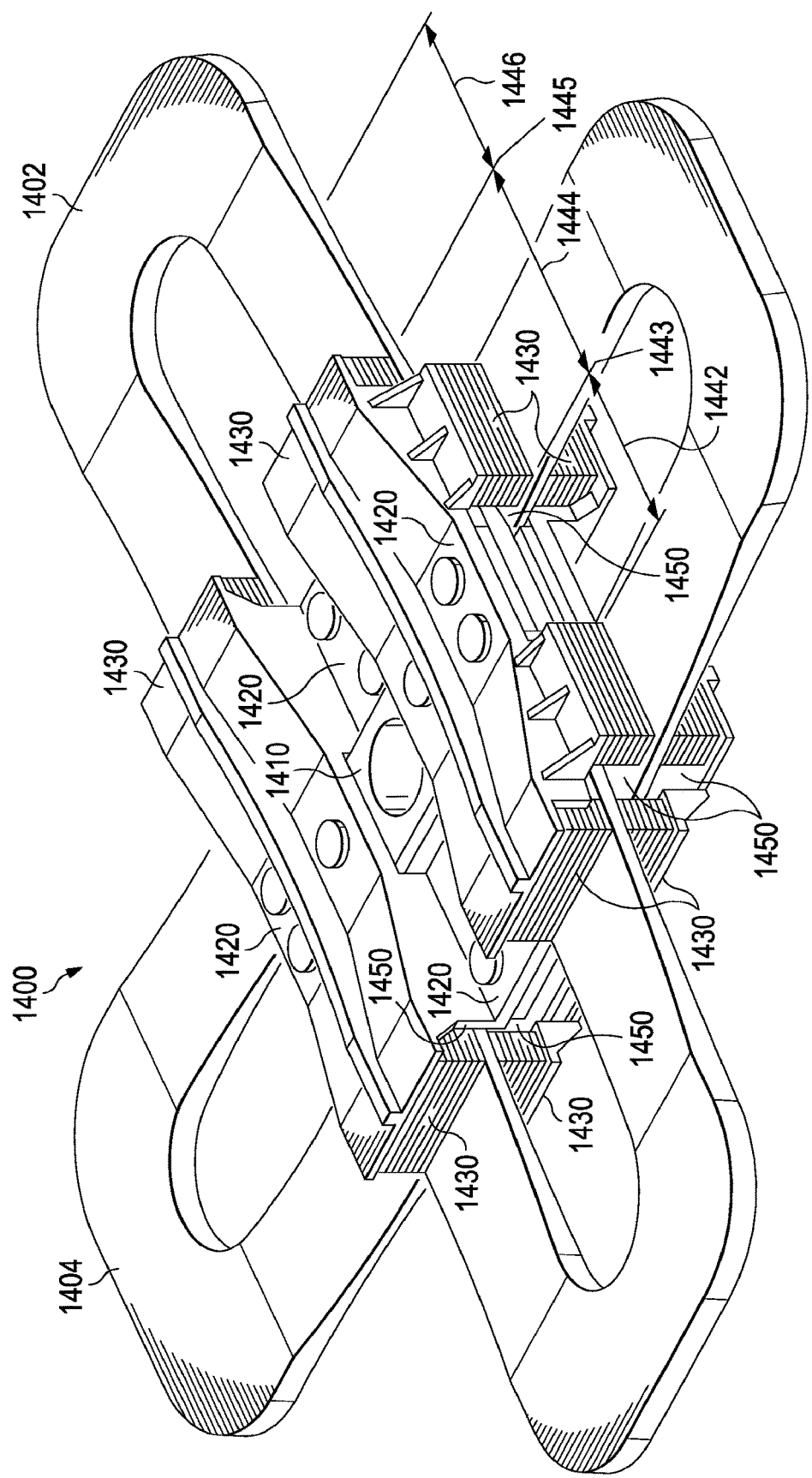
FIG. 14 is a perspective view of a composite rotor system having elastomeric bearing leaf springs according to an embodiment of the disclosure.

FIG. 14 is a perspective view of a composite rotor system 1400. Composite rotor system 1400 is in some aspects similar to composite rotor system 1300 in FIG. 13. However, in composite rotor system 1400, elastomeric bearings 1430 are used as leaf springs instead of a composite plate 1340. It should be noted that embodiments of the disclosure are not limited to only the elastomeric bearing and composite plate spring mechanisms shown in FIGS. 13-14. In other embodiments, spring mechanisms may include coil, torsional, flexure, or other types of mechanisms for applying spring force to control a bent shape of a yoke.

Similar to composite rotor system 1300 in FIG. 13, the yokes 1402 and 1404 are divided into three sections 1442, 1444, and 1446. In section 1442, each yoke 1402 or 1404 is disposed between and held in place by opposing mast adapter arms 1420. Accordingly, yokes 1402 and 1404 are essentially not able to flap in section 1442 because they are being constrained by the mast adapter arms 1420. Then, as the yoke 1402 or 1404 reaches section 1444, yokes 1402 and 1404 are supported by opposing elastomeric bearings 1430. Elastomeric bearings 1430 optionally include one or more layers made of an elastomeric material (e.g., rubber) interleaved by one or more layers made of a rigid material (e.g., a metal). Elastomeric bearings 1430 provide some support for yokes 1402 and 1404 in section 1444, but also permit flapping. Accordingly, yoke section 1444 will have a pivot point or a hinge point 1443 between sections 1442 and 1444. Also, it should be noted that in some embodiments, there may be a gap 1450 between where the mast adapter arms 1420 end and where the elastomeric bearings 1430 are positioned. Additionally, there may be a gap between the mast adapter arms 1420 and the yokes 1402 and 1404. In particular, the mast adapter arms 1420 are never in direct contact with yokes 1402 or 1404. Instead, the mast adapter arms 1420 clamp onto an adapter 1410 at the inboard end of the arms 1420. Adapter 1410 in turn clamps the yokes 1402, 1404 and also clamps the elastomeric bearings 1430 to the yokes 1402 and 1404.

In an embodiment, the pivot point or hinge point 1443 may occur within the gap 1450 between where the mast adapter arms 1420 end and where the elastomeric bearings 1430 are positioned. Then, as the yoke 1402 or 1404 reaches section 1446, yokes 1402 and 1404 are not supported by either mast adapter arms 1420 or elastomeric bearings 1430. Accordingly, in section 1446, yokes 1402 and 1404 are able to flap an additional amount because they are not supported by either mast adapter arms 1420 or elastomeric bearings 1430. In particular, another pivot point or hinge point 1445 is created where the elastomeric bearings 1430 end, and yoke section 1446 is able to flap about point 1445. Accordingly, similar to the embodiment in FIG. 13, composite rotor system 1400 in FIG. 14 may have two pivot points or hinge points (e.g., points 1443 and 1445) that enable greater yoke flapping. Also, the use of different yoke regions may again help reduce the intensity of strains in a yoke by more evenly distributing the stresses through a larger portion of the yoke.

Figure 15:
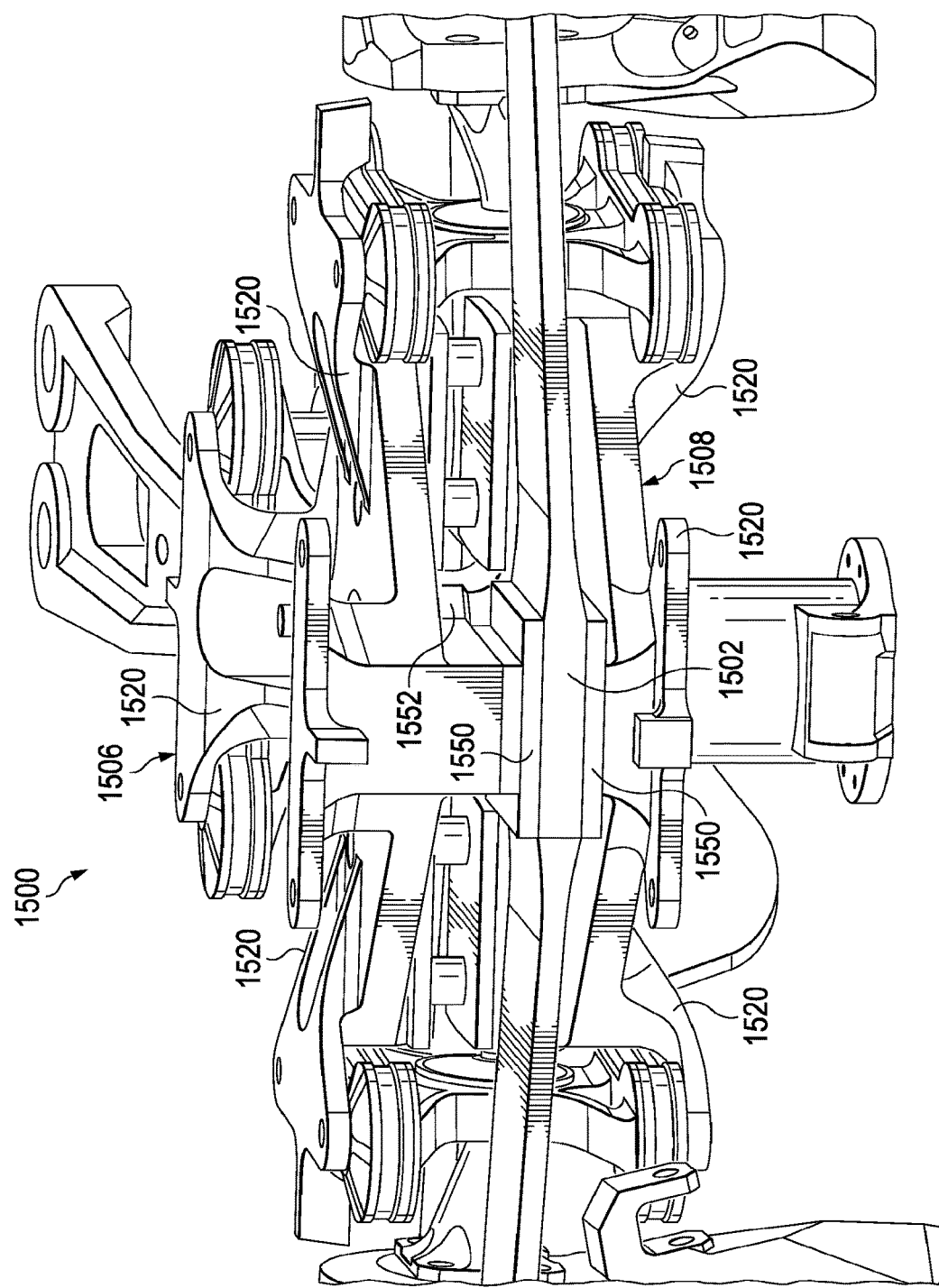
FIG. 15 is a side perspective view of a composite rotor system having yoke base plates according to an embodiment of the disclosure.

FIG. 15 is a side perspective view of a composite rotor system 1500. Composite rotor system 1500 is in some aspects similar to composite rotor system 400 in FIG. 4. However, in composite rotor system 1500, the top mast adapter 1506 and the bottom mast adapter 1508 are not directly connected to the yokes (e.g., yoke 1502). Instead, top mast adapter 1506 and bottom mast adapter 1508 are indirectly connected to the yokes through yoke base plates 1550.

In one embodiment, composite rotor system 1500 includes a drive hub 1552 that is illustratively directly connected to a rotor mast and transfers rotational movement from the rotor mast to the rest of the components of composite rotor system 1500. Drive hub 1552 can be a single-piece drive hub or could alternatively comprise multiple pieces. In the particular example shown in FIG. 15, drive hub 1552 is connected to top mast adapter 1506 and/or bottom mast adapter 1508. However, embodiments are not limited to any particular configuration of connecting drive hub 1552 to the rest of the components of composite rotor system 1500.

Top mast adapter 1506 and bottom mast adapter 1508 each includes one arm 1520 for each blade in a rotor system (e.g., 2, 3, 4, 5, 6 arms, etc.). Each arm 1520 is connected to a mast or center section of a yoke 1502 through a yoke base plate 1550. In particular, each yoke 1502 is held in place by an opposing pair of yoke base plates 1550, which are in turn held in place by top mast adapter 1506 and bottom mast adapter 1508. Additionally, it should be noted that each yoke base plate 1550 may be about the same size as the yoke mast or center sections (e.g., yoke section 502 in FIG. 5). This allows for the composite rotor system 1500 to not interfere with yoke flapping and also enables a yoke flapping point or virtual hinge point to be at a point that is further inboard as compared to other designs (e.g., the yoke flapping or virtual hinge point may be located between the mast and a shear bearing). In at least certain circumstances, this may enable composite rotor system 1500 to provide for increased flapping angles.

Figure 16:
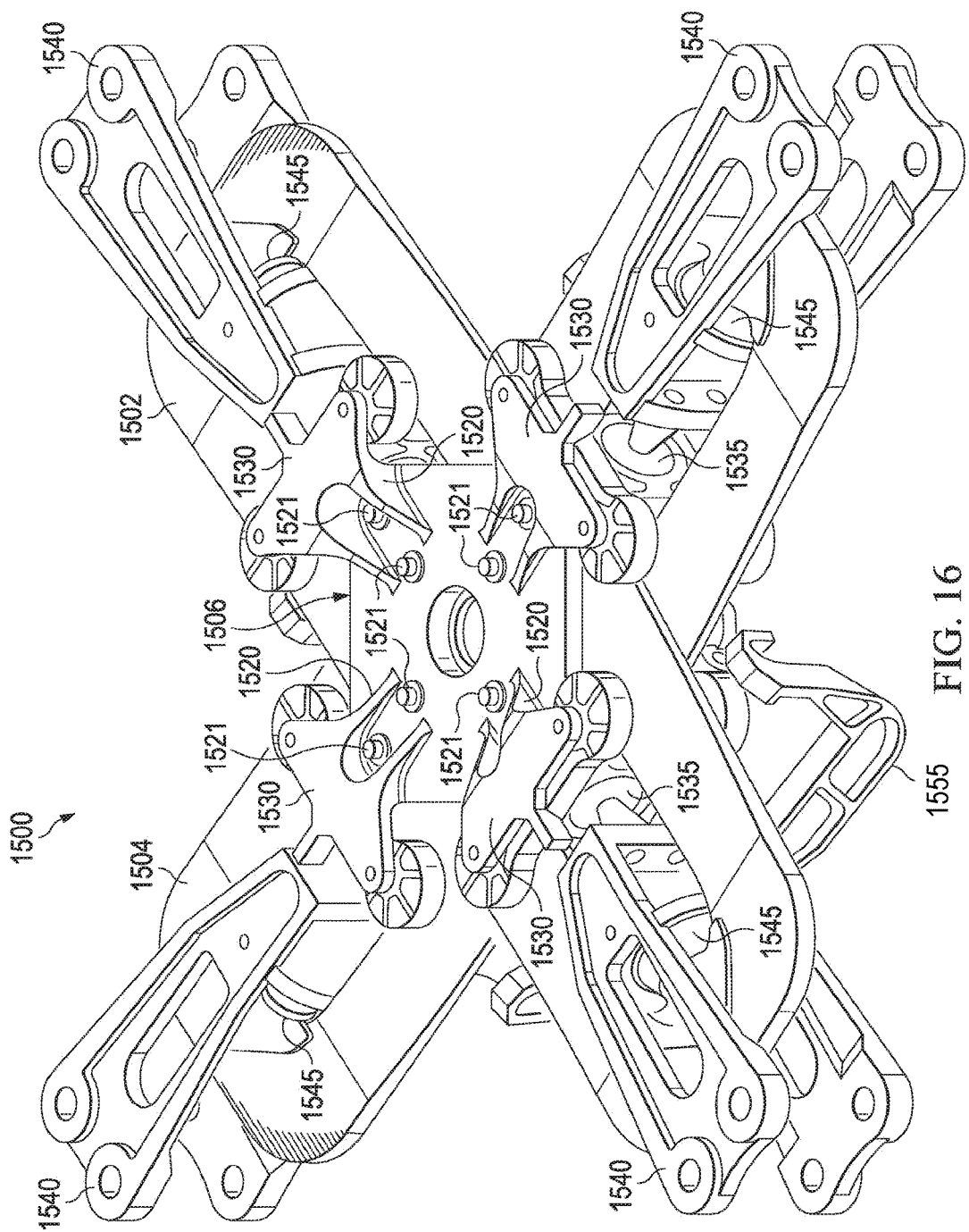
FIG. 16 is a top perspective view of the composite rotor system of FIG. 15 according to an embodiment of the disclosure.

FIG. 16 is a top perspective view of composite rotor system 1500 from FIG. 15. FIG. 16 shows that in one embodiment that top mast adapter 1506 has a diamond shape with the arms 1520 being located at the ends of the diamond points. However, embodiments are not limited to any particular shapes and top mast adapter 1506, as well as bottom mast adapter 1508 (shown in FIGS. 15 and 17), may have any shape. Furthermore, FIG. 16 shows that each mast adapter arm 1520 has two apertures or other attachment mechanisms 1521 that are configured to connect top mast adapter 1506, drive hub 1552 (shown in FIG. 15), yokes 1502 and 1504, and bottom mast adapter 1508 (shown in FIGS. 15 and 17) together. In one embodiment, such as in the example shown in FIGS. 15-17, the attachment mechanisms are positioned at station 0.0 (e.g., the center) of the yokes 1502 and 1504. In at least certain circumstances, station 0.0 of yokes 1502 and 1504 may experience less ILS stress as compared to other portions of the yoke that are further outboard. Accordingly, by being able to locate attachment mechanisms 1521 at station 0.0, there may be a reduced chance of yoke delamination caused by ILS stress at a hole/aperture in a yoke 1502 or 1504.

FIG. 16 further shows additional components that may optionally be included in a composite rotor system 1500. For instance, composite rotor system 1500 may include damper mounts 1530, shear bearings 1535, blade grips 1540, CF bearings 1545, and pitch horns 1555. The damper mounts 1530 may be integrally formed with the mast adapters 1506 and 1508 as is shown in FIG. 16, or alternatively, the damper mounts 1530 may be separate components that are attached to the mast adapters 1506 and 1508.

Figure 17:
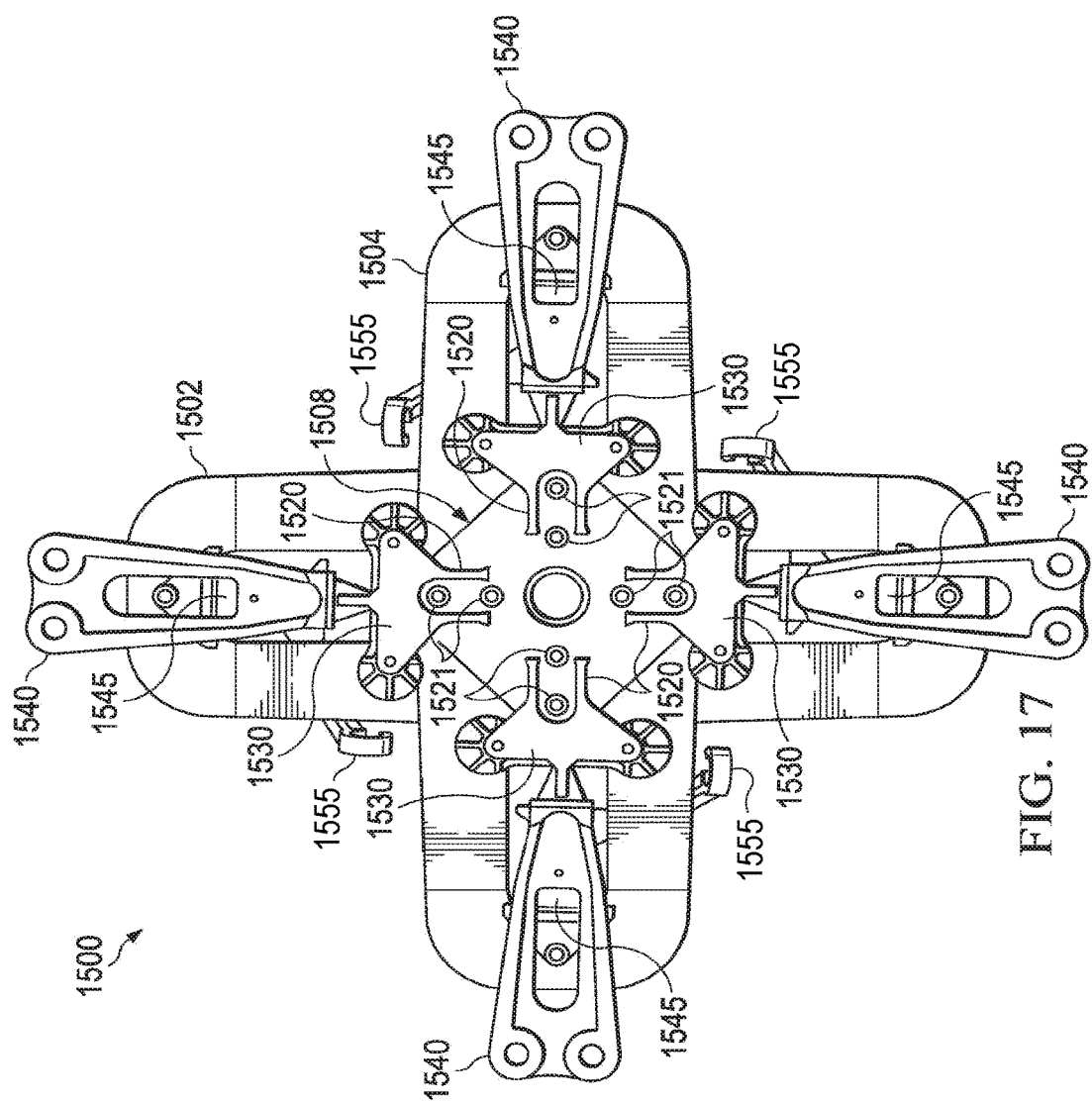
FIG. 17 is a bottom perspective view of the composite rotor system of FIGS. 15-16 according to an embodiment of the disclosure.

FIG. 17 is a bottom perspective view of composite rotor system 1500 from FIGS. 15-16. FIG. 17 more clearly shows the bottom mast adapter 1508 that was hidden or partially hidden in FIGS. 15-16. As can be seen in FIG. 17, bottom mast adapter 1508 has the same or similar shape as top mast adapter 1506 (shown in FIGS. 15-16). Bottom mast adapter 1508 includes a number of arms 1520, and each arm includes two apertures or other attachment mechanisms 1521 configured to connect to and support a yoke at station 0.0. Additionally, bottom mast adapter 1508 may have integrally formed or separately attached damper mounts 1530. FIG. 17, also shows other optional components such as, but not limited to, blade grips 1540, CF bearings 1545, and pitch horns 1555.

Figure 18:
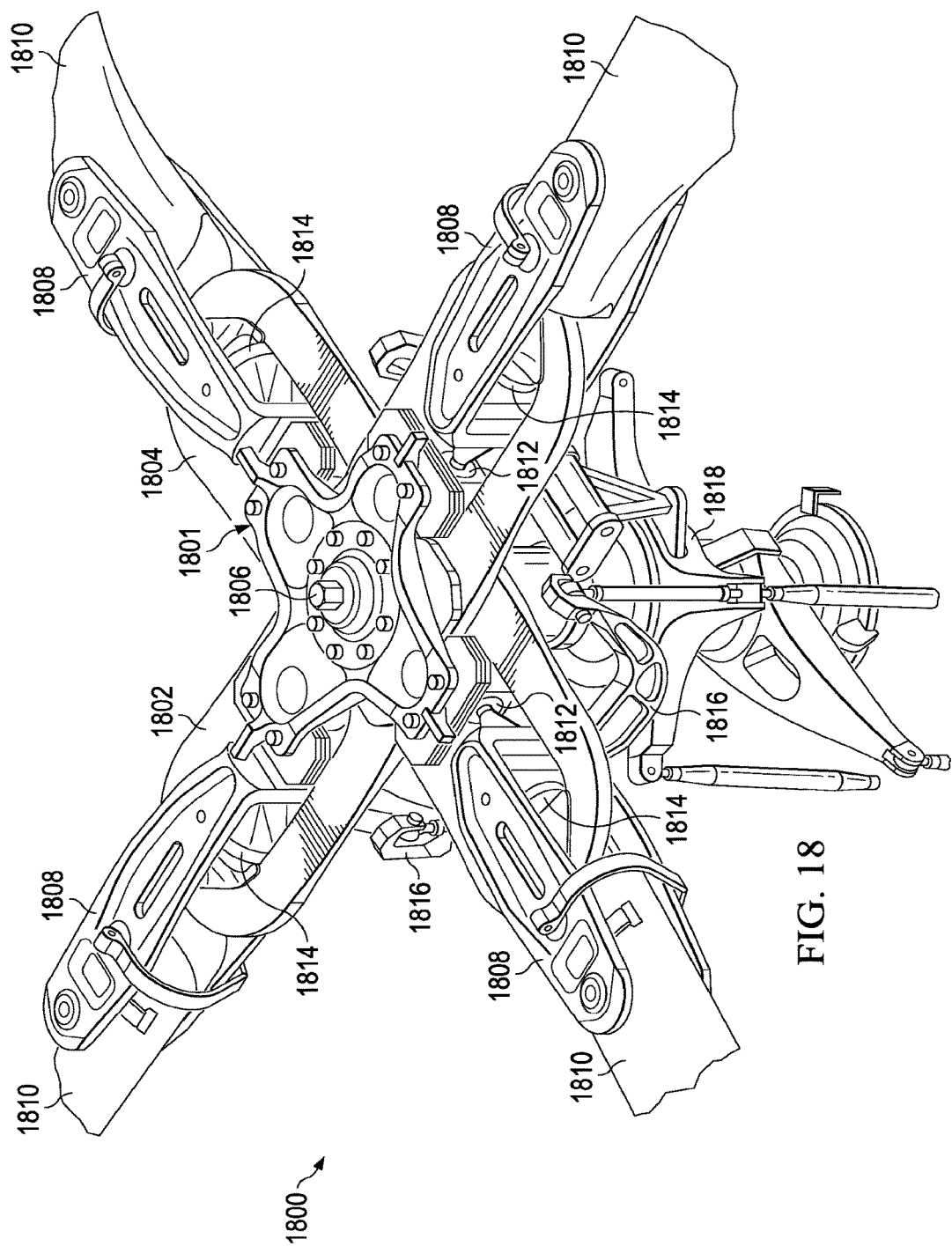
FIG. 18 is a perspective view of a rotor system according to an embodiment of the disclosure.

FIG. 18 is a perspective view of a rotor assembly 1800 in which one or more embodiments disclosed in this application can be incorporated within. For instance, the composite rotor systems in FIGS. 4 and 10-17 could be used in a rotor assembly such as rotor assembly 1800. However, embodiments are not limited to any particular operating environment and can be used in systems differing from the particular example shown in FIG. 18.

Rotor assembly 1800 includes a hub 1801 that connects yokes 1802 and 1804 to a mast 1806. Hub 1801 optionally includes any one or more of the components shown or described above such as, but not limited to, a top mast adapter, a bottom mast adapter, a drive hub, yoke base plates, composite plate leaf springs, elastomeric bearing leaf springs, integral or separate lead/lag dampers, attachment mechanisms (e.g., attachment mechanisms to connect to a yoke at station 0.0), I-shaped mast adapter arms, V-shaped mast adapter arms, etc.

Each yoke 1802 and 1804 supports a pair of blade grips 1808, and each blade grip 1808 supports a rotor blade 1810. Each blade grip 1808 is in turn supported by a shear bearing 1812 and a CF bearing 1814. The blade grips 1808 are each connected to a pitch horn 1816 that is driven by a pitch linkage 1818 that enables blades 1810 to be articulated.

As has been described above and shown in the figures, certain embodiments of the disclosure include a composite rotor system that uses two race track style cantilevered yokes. In at least some circumstances, the composite rotor system may increase the flapping angles of a rotor blade. This can be accomplished in some instances by using two cruciform mast adapters that have only a limited amount of contact or no contact with the yoke flexure sections. This increases the length of the yoke flexure sections that can flap which results in the yoke being able to accommodate a greater amount of flapping. Some embodiments may also be able to increase the flapping angles of a rotor blade by using additional features such as, but not limited to, yoke base plates, yoke attachment mechanisms at station 0.0, leaf springs (e.g., composite plate leaf springs or elastomeric bearing leaf springs), I-shaped mast adapter arms, and/or V-shaped mast adapter arms. Additionally, at least certain embodiments of the disclosure may also be advantageous in that the composite rotor systems have lower weights and require fewer components than other rotor systems. For instance, other rotor systems may require more mast adapters and/or other hardware to support a stacked yoke.

Finally, it should be noted that at least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

What is claimed is:

1. A hub system comprising:
    a stacked yoke comprising at least a first race-track style yoke and a second race-track style yoke each having an annular shape; and
    a mast adapter configured to transfer rotation from a rotor mast to the hub system to rotate the hub system about a central axis of rotation, and configured to attach to and support the stacked yoke, the mast adapter including an outer plate and an inner plate connected by a web, wherein the inner plate attaches to the stacked yoke and comprises an inboard section that is not connected to any other portion of the mast adapter such that each yoke in the stacked yoke is configured to accommodate at least some amount of rotation about an axis that is perpendicular to or about perpendicular to the central axis of rotation.

2. The hub system of claim 1, wherein the mast adapter comprises apertures in a cruciform pattern, and wherein the apertures are configured to connect to a center or about the center of a mast section of each yoke in the stacked yoke.

3. The hub system of claim 1, wherein the inner plate is configured to transfer the rotation from the rotor mast to the stacked yoke, and wherein the outer plate is configured to control out-of-plane motion and spanwise torsion of the stacked yoke.

4. The hub system of claim 3, wherein the inner plate is configured to absorb shear strain from a flexure section of each yoke in the stacked yoke to reduce an amount of shear strain in apertures of the stacked yoke.

5. The hub system of claim 4, wherein the inner plate comprises a composite material or a metal.

6. The hub system of claim 3, wherein the inner plate is configured to transfer torque to the stacked yoke, and wherein the outer plate is configured to control flapping and feathering of the stacked yoke.

7. The hub system of claim 1, wherein the mast adapter comprises a flexure section that is configured to attach to and support the stacked yoke.

8. The hub system of claim 7, wherein the flexure section comprises an I-shaped cross-section or a V-shaped cross-section.

9. The hub system of claim 7, wherein the flexure section is integrally formed with the mast adapter, or wherein the flexure section and the mast adapter comprise separate components.

\* \* \* \* \*